US012298131B2

(12) United States Patent
Donadello et al.

(10) Patent No.: US 12,298,131 B2
(45) Date of Patent: May 13, 2025

(54) METHOD AND SYSTEM FOR DETERMINING THE POSITION OF AN ELEMENT OF AN OPTICAL SYSTEM IN AN ASSEMBLY FOR PROCESSING OR MEASURING AN OBJECT, AS WELL AS THE POSITION OF SAID OBJECT RELATIVE TO SAID ASSEMBLY, BY PARALLEL INTERFEROMETRIC MEASUREMENTS

(71) Applicant: ADIGE S.P.A., Levico Terme (IT)

(72) Inventors: Simone Donadello, Rodigo (IT); Barbara Previtali, Milan (IT); Daniele Colombo, Renate (IT)

(73) Assignee: ADIGE S.P.A., Levico Terme (IT)

( * ) Notice: Subject to any disclaimer, the term of this patent is extended or adjusted under 35 U.S.C. 154(b) by 389 days.

(21) Appl. No.: 17/781,749

(22) PCT Filed: Dec. 4, 2020

(86) PCT No.: PCT/IB2020/061513
§ 371 (c)(1),
(2) Date: Jun. 2, 2022

(87) PCT Pub. No.: WO2021/111399
PCT Pub. Date: Jun. 10, 2021

(65) Prior Publication Data
US 2023/0013339 A1    Jan. 19, 2023

(30) Foreign Application Priority Data

Dec. 6, 2019 (IT) .................. 102019000023229

(51) Int. Cl.
*G01B 9/02015* (2022.01)
*G01B 9/0209* (2022.01)
*G01B 11/14* (2006.01)

(52) U.S. Cl.
CPC ....... *G01B 9/02027* (2013.01); *G01B 9/0209* (2013.01); *G01B 11/14* (2013.01)

(58) Field of Classification Search
CPC ............ G01B 9/02016; G01B 9/02021; G01B 9/02025; G01B 9/02027; G01B 9/02028; G01B 9/02032; G01B 9/0209
See application file for complete search history.

(56) References Cited

U.S. PATENT DOCUMENTS 5,301,010 A * 4/1994 Jones .................. G01B 9/0201
356/497
2009/0091766 A1  4/2009 Hirose
(Continued)

FOREIGN PATENT DOCUMENTS

EP      1582143 A1   10/2005
WO   2010092533 A1    8/2010

OTHER PUBLICATIONS

International Search Report, issued in PCT/IB2020/061513, mailed May 18, 2021, Rijswijk, NL.
(Continued)

*Primary Examiner* — Michael A Lyons
(74) *Attorney, Agent, or Firm* — ArentFox Schiff LLP; Michael Fainberg

(57) ABSTRACT

A method and a system for determining relative position of an element of an optical system of an assembly for processing or measuring an object along a measurement line, involve generating a measurement beam and a reference beam of low coherence optical radiation. The measurement and reference beams, alternately or in combination, have a main beam and a multiplexed additional beam. The measurement beam, led toward the element of the optical system, and back-reflected, is superimposed on the reference beam in a region of common incidence of an interferometric
(Continued)

optical sensor arrangement. Position or frequency of a main interference fringe pattern and an additional interference fringe pattern is detected.

23 Claims, 11 Drawing Sheets

(56) References Cited

U.S. PATENT DOCUMENTS

| | | |
|---|---|---|
| 2015/0201833 A1 | 7/2015 | Chong |
| 2016/0039045 A1 | 2/2016 | Webster |
| 2022/0410309 A1* | 12/2022 | Donadello ........... B23K 26/046 |
| 2023/0013723 A1* | 1/2023 | Donadello ......... G01B 9/02072 |

OTHER PUBLICATIONS

Balonek Gregory et al., Assembly, alignment and test of the Transiting Exoplanet Survey Satellite (TESS) optical assemblies, Proceedings of SPIE, Aug. 22, 2017, pp. 103770j1-11, vol. 10377, SPIE, US.

* cited by examiner

METHOD AND SYSTEM FOR DETERMINING THE POSITION OF AN ELEMENT OF AN OPTICAL SYSTEM IN AN ASSEMBLY FOR PROCESSING OR MEASURING AN OBJECT, AS WELL AS THE POSITION OF SAID OBJECT RELATIVE TO SAID ASSEMBLY, BY PARALLEL INTERFEROMETRIC MEASUREMENTS

CROSS-REFERENCE TO RELATED APPLICATIONS

This application is a National Phase Application of PCT International Application No. PCT/IB2020/061513, having an International Filing Date of Dec. 4, 2020 which claims priority to Italian Application No. 102019000023229 filed Dec. 6, 2019, each of which is hereby incorporated by reference in its entirety.

FIELD OF THE INVENTION

The present invention deals in general with industrial processing or measuring methods for objects or materials, for example carried out by means of a tool, an instrument, or a probe, arranged at a predetermined separation distance or in contact with the object or the material, for example in the control of the laser processing of a material, for example for laser cutting, drilling, or welding of said material, or for the additive manufacturing of predetermined structures of said material.

In particular, the invention deals with the determination of the relative position of an element of an optical system or of an at least partially reflective surface external thereto, in regard to a corresponding predetermined reference of a processing or measuring assembly. An element of an optical system is an element situated along a direction of propagation of a laser beam of a processing assembly, such as a head of a laser processing machine, or along a direction of propagation of an optical measurement radiation in a measuring assembly of a machine tool. Its relative position is determined by comparison with a predetermined reference element, such as the radiation source or one end of a processing tool or a measuring instrument. An at least partially reflective surface external to the optical system of a processing or measuring assembly is, for example, a surface of an object undergoing processing or measurement and its relative position is determined by comparison with a predetermined reference element, such as the source of the optical radiation for processing or measurement or one end of a processing tool or a measuring instrument facing the object in an operating condition.

The invention furthermore relates to the performing of parallel measurements of the position of a plurality of elements of an optical system or the position of a plurality of reflective surfaces external to the system, or also the performing of a parallel measurement of the position of an element of an optical system and a reflective surface external to the system.

More specifically, the present invention relates to a method for determining the relative position of an element of an optical system of an assembly for processing or measuring an object along a predetermined line of measurement associated with the system.

According to a further aspect, the present invention relates to a machine for laser processing of a material.

The present invention also relates to a method for determining the separation distance between a processing tool or a measuring instrument and an at least partly reflective surface of an object external to it, along a predetermined line of measurement associated with at least a proximal portion of the processing tool or the measuring instrument with respect to the surface of the object.

According to a further aspect, the present invention relates to a machine for laser processing of a material.

According to yet another aspect, the present invention relates to a method for determining the position of a plurality of elements at least partly reflective to an optical radiation in a system including a plurality of optical components of an assembly for processing or measurement, or including at least one optical element of an assembly for processing or measuring and one object external to it and subjected to said processing or measurement, wherein said plurality of at least partly reflective elements is arranged along a predetermined common line of measurement.

In the following specification and claims, the term "object" indicates a finished product or a workpiece being processed. When applied to machine tools and in particular to machines for laser processing, the term "workpiece" and, in the preferred embodiment, "metal workpiece," is used to identify any given manufactured article, such as a sheet or an elongated profile having a cross section either closed—such as a hollow circular, rectangular, or square one—or open—such as a flat section or an L, C, U, or other shaped section. The term "material" or "precursor material" in additive manufacturing identifies the raw material, generally a powder, subjected to sintering or localized melting by the laser beam.

In the following specification and claims, the term "material" and, in the preferred embodiment, "metal material," is used to identify any given manufactured article, such as a sheet or an elongated profile having a cross section either closed—such as a hollow circular, rectangular, or square one—or open—such as a flat section or an L, C, U, or other shaped section. In additive manufacturing, the term material identifies the raw material, generally a powder, subjected to sintering or localized melting by the laser beam.

BACKGROUND OF THE INVENTION

In industrial processes, it is common for a processing tool to approach an object—without coming into contact with it—or a material to produce a remote processing, for example by emission of working fluids or radiations. It is also known for a measuring instrument to approach a workpiece or a material being processing processed in the course of a manufacturing process for a product, or also the finished product, in order to detect certain of its geometrical characteristics or physical properties during a an interruption of, in the course of, or at the end of a manufacturing process.

Merely as an example of an industrial processing method, in the processes of laser working of materials, and metal sheets and profiles in particular, a laser radiation is used as a thermal tool for a large variety of applications which depend on the parameters of interaction of the laser beam with the piece being processed, specifically the energy density per volume of incidence of the laser beam on the piece, and the range of the interaction time.

For example, by directing a low energy density (on the order of tens of W per $mm^2$ of surface) for a lengthy time (on the order of seconds) onto a metal piece, a tempering process is realized, while by directing an elevated energy density (on the order of tens of MW per $mm^2$ of surface) for a time on the order of femtoseconds or picoseconds onto said metal piece, a photo-ablation process is realized. In the intermediate range of increasing energy density and decreasing processing time, the control of these parameters allows one to perform processes of welding, cutting, drilling, engraving, and marking. These processes occur by emitting the laser beam from a working head that operates at a distance from the piece being processed.

In many processes, including working processes processing by drilling and cutting, it is necessary to also provide a flow of an assist gas at the processing region processing where the interaction occurs between the laser beam and the material, having mechanical functions of propulsion of the melt, or chemical functions of assisting the combustion, or also technological functions of shielding the surrounding area of the processing region. The assist gas flow is also emitted by a respective nozzle at a distance from the piece being manufactured.

In additive manufacturing, the material may be supplied, for example, in the form of a filament, or in the form of powder emitted from a nozzle, thanks to the flow of an assist gas, or alternatively it may be present in the form of a powder bed. The material is then melted by laser radiation, obtaining a three-dimensional mold after the resolidification of the material itself.

In the field of laser processing of materials, laser cutting, drilling, and welding are processes which can be implemented by the same machine, which is able to generate a high-power focused laser beam having a predetermined transverse power distribution in at least one working plane processing of the material, typically a laser beam with power density between 1 and 10000 kW/mm$^2$, and to control the direction and the position of incidence of the beam along the material, as well as control—when necessary—the direction of the assist gas flow. The difference between the various types of processing which may be performed on a material basically comes down to the power of the laser beam used and the time of interaction between the laser beam and the material being processed.

A machine tool working on a piece being processing is shown in FIG. 1.

FIG. 1 shows a working head 10 of a machine tool, such as a machine for the laser processing of a piece or a material, situated at a separation distance d from the material being processed WP, and an associated processing control unit ECU. A processing or measurement instrument is denoted generically by 12, such as a tool for processing, a nozzle for emitting a working fluid, an output for a processing radiation such as a high-power laser radiation for hardening, welding, cutting, drilling, engraving, marking, photo-ablation, or sintering of a material, or a measurement probe.

The processing or measurement instrument 12 may be considered as being the distal section of the working head, having as reference the entire machine, or as being the proximal end to the piece or material being processed, and these terms shall be used interchangeably in the specification.

In a machine for laser processing, the output of the processing radiation or the "beam output" is the section of the working head from which the processing laser beam emerges into the free space, or propagates outside of the volume of the head, toward the piece of material being processed, and it may be the terminal section of an optical focusing system or a protective structure thereof, or also the tapered end of a nozzle dispensing an assist gas flow, for applications requiring the supplying of gas for the processing.

Coupled to the working head 10 are movement actuator means 14 controlled by the processing control unit ECU via servomotors 16, for the control of the mechanical parameters of the processing, such as control of the movement of the working head along the degrees of freedom allowed by the specific embodiment of the machine in order to follow a programmed working trajectory T on the piece or material, in particular, for the movement along the Z axis to approach or move away from the piece or material, depending on its profile or the processing profile.

FIG. 2 exemplifies a working head 10 according to the prior art for laser processing. A tubular channel is represented as 30, having sections of cylindrical or conical shape, within which the laser beam is transmitted, indicated by B. The laser beam B, generated by an emission source not shown, is transported to the working head by an optical path in the air with multiple reflections or in an optical fiber, and impinges in a collimated manner on a reflecting deflector element 32 which deflects its optical axis of propagation in a direction of incidence on the piece or material being processed. An optical focusing system 20 is intermediate between the reflecting deflector element 32 and a protective glass 34 situated downstream, able to shelter the focusing system from any molten spatter, and it comprises a lens holder 36 coupled with mechanical regulating mechanisms 38 for calibrating the positioning of the lens transversely to the direction of propagation of the beam (X-Y axes) and in the direction of propagation of the beam (Z axis).

Although FIG. 2 shows a diagram of a working head using a high-power laser beam, for purposes of the invention the optical assembly or the optical chain shown in the figure may be considered as substantially corresponding to an optical assembly of a measurement probe operating by means of a beam of low-power optical radiation impinging on an object or material, from which the beam is reflected or scattered and processed according to one of the methods of the prior art.

In the industrial processes in which a processing or measurement instrument approaches an object or a material being processed, the results of the processing or the measurement depend on the correct distance between the processing instrument and the object or material. For example, in the laser processing of a piece or material, and specifically in the control of the laser processing of a metal piece for laser cutting, drilling, or welding, or the additive manufacturing of predetermined structures from a powder precursor material, it is important that the processing instrument be maintained at a controlled distance from the piece or material. In the same example, the control of the direction of propagation or the forms of transverse distribution of the power of the laser beam, for example with regard to the controlled distribution of an assist gas or as a function of the separation distance between the working head and the piece or material, the working trajectory to be followed, and the type of processing being done, provides advantages to the processing process. For example, the control of the power distribution of a laser beam may enable a localizing or expanding of the power distribution in relation to the separation distance between the working head and the piece or material and the working trajectory. The same may be said in the case of the irradiation of an optical beam for measurement of the physical properties or the dimensions of a piece or material.

Obviously the control of the distance between a processing or measurement instrument and an object or material being processed, as well as the direction of propagation and transverse distribution of an optical processing or measurement beam, such as a laser beam, should be as precise and repeatable as possible in order to obtain an efficient and precise processing, or an accurate measurement. For this, it is necessary that the movement of the working head and the position of its proximal end with respect to the piece or material, for example the position of the output of a laser processing beam—and of the assist gas outlet nozzle in the processing which requires this—or that of an optical measurement beam with respect to the piece or material, and in particular with respect to the point of incidence of the beam on the material, be controlled with extreme precision and in real time as a function of the current processing condition and the current position along the working trajectory. Otherwise, one runs the risk of focusing the power of a processing laser beam in an undesirable working plane in the thickness of the piece or material, as well as using an assist gas pressure—at the surface of the piece or material—which is excessive or insufficient. During a measurement, one runs the risk of not adequately focusing the optical measurement radiation on the object, obtaining a measurement not representing the reality.

It is likewise necessary for the position of the optical elements associated with the optical transport path of an optical beam in the processing or measuring head of a machine (situated along the optical path, or facing or situated alongside it) to be controlled with extreme precision and in real time. Otherwise, for example in laser processing, one runs the risk of focusing the laser power in an undesirable working plane in the thickness of the material.

The position of the optical elements may vary as a function of the current operating conditions of the machine, including the current temperature of the optical elements and zones through which a high-power laser processing beam passes, the pressure of an assist gas exerted on an optical element opposite the assist gas nozzle, the possible mechanical deformation of the optical elements associated with the optical beam transport path (fiber, mirrors, lenses), but also due to positioning errors of the elements on the part of the technician at the time of installation or the presence of design tolerances and unwanted play in the assembly process.

A variation in the position of an optical element with respect to the expected nominal position may produce uncontrolled variations in the process or influence the measurement of the process, such as the measurement of the separation distance of the working head from the piece or material, or the position of the laser beam output and the assist gas outlet nozzle in processing which requires this.

For these reasons, in the field of industrial processing it is desirable to be able to determine with accuracy the separation distance between the working head, or the proximal end of the working head with respect to the piece or material, and the surface of the piece or material itself, as well as the local position of an optical element associated with an optical transport path of an optical processing or measurement beam.

SUMMARY OF THE INVENTION

The purpose of the present invention is to provide a method for effectively monitoring, optionally in real time, a process of processing or measurement of a piece or a material by means of an optical radiation beam.

In particular, the purpose of the present invention is to provide a method for determining the relative position of an element of an optical system of a machine tool for the processing or the measurement of a piece or material by an optical radiation beam, such as is accurate and robust.

In particular, another purpose of the present invention is to provide an accurate and robust method for determining the separation distance between a processing tool or a measuring instrument of a machine tool for the processing or the measurement of a piece or material by an optical radiation beam, and the surface of an object external to it.

Another purpose of the present invention is to provide a method for effectively monitoring, optionally in real time, a process of processing or measurement of a piece or material by an optical radiation beam, determining the relative position of an element of an optical system of an assembly for processing or measurement of an object or the separation distance between a processing tool or a measuring instrument and the surface of an object external to it, in a broad range of distances which are measurable without sacrificing the accuracy of the measurement.

Yet another purpose of the present invention is to provide a method able to compensate for any measurement perturbations in the relative position of an optical element or the separation distance between a processing tool or a measuring instrument and the surface of an object external to it.

Yet another purpose of the present invention is to provide a method able to conduct a plurality of measurements of the relative position of an optical element or the separation distance between a processing tool or a measuring instrument and the surface of an object external to it, in a shorter time.

Another purpose of the present invention is to provide a method for the aforementioned purposes which is applicable to a machine for the laser processing of a workpiece or material.

According to the present invention, these purposes are achieved thanks to a method for determining the relative position of an element of an optical system of an assembly for processing or for measurement of an object along a predetermined measurement line associated with the system, and a method for determining the separation distance between a processing tool or a measuring instrument and an at least partly reflective surface of an object external to it, along a predetermined line of measurement associated with at least one proximal portion of the tool, or the instrument, with regard to the surface of the object as described and claimed herein.

Another subject of the present invention is a method for of determining the relative position of an element of an optical system of an assembly for processing or for measuring an object along a predetermined measurement line associated with the system, and a method for determining the separation distance between a processing tool or a measuring instrument and an at least partly reflective surface of an object external to it, along a predetermined line of measurement associated with at least one proximal portion of the tool or instrument, with respect to the surface of the object.

Particular embodiments are also described.

Further subject matter of the present invention is a machine for laser processing of a material.

In brief, the present invention is based on an application of the principles of optical interferometry.

By the term "optical interferometry" is meant a plurality of techniques making use of the phenomenon of interference between an optical measuring beam and an optical reference beam, which when superimposed generate interference fringes. The theory of optical interferometry in coherent light is well known and finds application in the relative comparing of distances, yet without being able to provide unequivocal information on the absolute measurement of said distances, for example, after a temporary interruption of the optical signal.

The present invention is inspired by the consideration that an absolute measurement of distance may be realized optically by employing a low-coherence interferometry technique. Low-coherence interferometry is a simple technique for measuring distances between a probe and an objective lens with high precision, and is based on a comparison of the distance traveled by an optical measurement beam, which is propagated from a source to a detecting assembly and in this path is emitted from the probe and back-reflected from the target, and the distance traveled by an optical reference beam which is propagated from the source to the detecting assembly through a reference path tuned to the measurement path in a nominal known distance condition between the probe and the target.

In the low-coherence interferometry technique, the optical measurement and reference beams are generated by low-coherence sources, such as LEDs or super luminescent diodes, and the interference fringes between said beams appear only under the condition of correspondence between the respective optical paths—or optical path lengths—the optical path being defined as the sum of the products of the geometrical lengths and the respective indices of refraction between each segment along the entire optical path traveled—that is, when the length of the measurement path corresponds to the length of the reference path in the interval of the coherence length. Taking as known the length of the reference path, it is possible to obtain the length of the measurement path by detecting the presence of the envelope of the interference fringes with a resolution on the order of the coherence length, which is on the order of micrometers (between 5 um and 100 um).

This technique is particularly robust with respect to optical noise, since the light coming from other sources or from the laser processing process itself is added incoherently to the interferometric signal without altering the interference fringe pattern. The application of the measurement is local at the point where the optical measurement beam is directed and independent of the surrounding morphology. This furthermore allows absolutely precise measurements of distances in a distribution substantially coaxial to the laser processing.

Various techniques are known for detecting the interference fringe pattern, respectively: in the time domain, in the frequency domain, and in the space domain. Advantageously, the techniques of low-coherence interferometry with detection of the interference fringe pattern in the space domain and the frequency domain appear to be more promising and more efficient in terms of operating flexibility as compared to the detection in the time domain.

In low-coherence interferometry with detection in the time domain, the interference fringe pattern is detected by a photodiode or by an array of photodiodes, or by an analogue acquisition screen, adapting the length of the reference path until achieving a condition of correspondence between the lengths of the reference path and the measurement path, except for a tolerance on the order of the coherence length. In this case, the limitation on the interval of available measurements is due to the adapting of the length of the reference path which—for example—is done by means of the translatory movement of a back-reflecting element situated along said path, the spatial interval of translatory movement of the back-reflecting element of the reference path being between a few microns and a few millimeters, and the breadth of the translation range coming at the expense of the actuating velocity or the operating complexity.

Even though the technique of detection in the time domain is rather easy to implement and allows for easily achieving the correspondence between the absolute optical lengths of the measurement path and the reference path, it is still poorly adapted to being implemented for measurement applications in real time of the course of an industrial process. In fact, for a dynamic measurement, the length of the reference path needs to be modulated continuously in order to find the condition of correspondence with the length of the current measurement path which determines the appearance of the interference fringe pattern. This may be obtained with various types of control devices, including modulators of the index of refraction or rapid mechanical actuators, such as those of the piezoelectric type; however, such types of device are rather costly and very delicate, because they need to work at an actuating speed much greater than the sampling rate for the measurement of the distance, which is typically greater than kHz, a condition which often may not be easily obtained, especially in the range of large displacements.

A different detection technique is based on the Fourier transform relation between the spectral density function and the cross correlation of the measurement and reference beams, by means of which it is possible to extract the differential measurement of distances in real space from the spectral profile of the wavelengths of the two interfering beams. In this way, no mechanical actuators are needed to align the length of the reference path with the length of the measurement path. A single spectral acquisition of the superimposed measurement and reference beams is possible by using a diffraction grating and a focusing lens downstream from it to project the spectral distribution of the interfering beams onto a linear sensor device, such as a video camera. The spectrum of the two interfering beams shows a periodic modulation and the periodicity (frequency) of this modulation in the space of the wavelengths varies upon varying the difference between the optical lengths of the measurement path and the reference path. An algorithm for computing the Fourier transform, such as an FFT algorithm, is applied to extract the measurement of the signal strength peak in relation to the difference between the optical paths in real space.

Contrary to the techniques of low-coherence interferometry in the time domain, in which a scanning of the lengths of the reference path is distributed in time, and in the frequency domain, in which the information on the comparison between the length of the measurement path and the length of the reference path is encoded in the space of the wavelengths, the technique of low-coherence interferometry with detection in the space domain combines the two preceding techniques and makes it possible to visualize directly the outcome of the measurement in real space, making possible a rapid acquisition by means of an economical device, such as an image sensor, for example a linear sensor.

In the typical embodiment of a low-coherence interferometry system with detection in the frequency domain, the measurement beam and the reference beam are superimposed collinearly along the same direction of incidence going toward wavelength dispersive optical means, such as a diffraction grating, refraction prisms, or analogous optical elements for the detection of optical spectra which are able to separate the frequency components of the entire beam obtained from the superimposing of the measurement beam and the reference beam in the region of common incidence of optical interferometric sensor means. In such a configuration, the spectrum (the interference fringe pattern) of the two interfering beams shows a periodic modulation and the periodicity of the fringe pattern in the space of the wavelengths varies upon varying the spatial variation of the optical measurement path with respect to the optical reference path, and its extension in the frequency domain is determined by the coherence length of the low-coherence optical radiation. Therefore, the measurement of the difference between the length of the optical measurement path and the length of the optical reference path may be extracted by processing the signals put out by the sensor means to detect the frequency of the interference fringe pattern between the measurement beam and the reference beam.

In the typical embodiment of a low-coherence interferometry system with detection in the space domain, the measurement and the reference beams are superimposed and impinge on the surface of the sensor means from different directions, and the surface of the sensor means is directly able to detect the interference fringe pattern produced by such superimposing. In such a configuration, a spatial variation of the optical measurement path in relation to the optical reference path is visualized directly on the sensor means thanks to the angle of mutual inclination of the two beams. Therefore, the measurement of the difference between the length of the optical measurement path and the length of the optical reference path may be extracted by simply detecting the position of the interference fringe pattern on the sensor means, the extension of the interference fringe pattern in the linear dimension of the sensor means being on the order of the coherence length of the optical radiation of the beams.

In the technique of low-coherence interferometry with detection in the space domain, the length of the optical path of each beam impinging obliquely on the common region of incidence of the sensor means varies as a linear function of the position along the axis of illumination of the sensor means, and therefore the difference between the optical measurement and reference paths also varies as a linear function. The interference fringe pattern appears in a specific linear interval of the image acquired by the sensor means, corresponding to the condition of equality of the optical lengths of the measurement path and the reference path within the coherence length of the optical radiation, while in the other areas of the sensor means the beams are superimposed in an incoherent manner. By detecting the position of the envelope of the interference fringe pattern along the linear extension of the sensor means, it is possible to extract the respective length of the measurement path.

This measurement is limited solely by the conditions in which the envelope of the interference fringe pattern is established within the region of illumination of the sensor means, or within the sensitive area of the photodetector devices realizing the sensor means. The measurement interval is determined by the inclination of the beams at the region of incidence, or even better by the angle of incidence between them, and—given equal inclination of the beams—by the minimum between the number of photodetectors, or areas of photodetection (also indicated as pixels of the sensor means), illuminated by the superimposed beams, and the total number of photodetectors of the sensor device, or by the minimum number of areas (pixels) needing to be illuminated in order to demodulate the interference fringe pattern with respect to the total number of areas (pixels) available on the sensor means. In common conditions, with a sensor device comprising thousands of photodetectors, a measurement interval of tenths of a millimeter may be obtained prior to the appearance of an aliasing effect of the interference fringes. However, the inventors have shown that the presence of the aliasing effect of the interference fringe pattern is not limiting to the measurement, but may even be utilized to increase the interval of measurable distances. In fact, such an undersampling is reflected in an effective demodulation of the fringe pattern at low spatial frequencies, a demodulation achieved analogically directly at the level of the photodetectors of the interferometric sensor device without the need for interpositioning of further elements.

Advantageously, the use of an interferometry technique with detection in the space domain enables accurate distance measurements to be performed with a static system of optical measurement and reference paths and for each individual acquisition or sampling of the spatial distribution of the optical radiation of the superimposed measurement and reference beams impinging on the sensor means. In order to realize a system of this kind, all that is needed are standard optical elements and the processing of the signals emitted by the sensor means is based on simple calculation algorithms, not being hungry in computing resources.

The application of the foregoing considerations to a machine tool—such as a machine for the laser processing of a material, in particular, for laser cutting, drilling, or welding, or for the additive manufacturing of three-dimensional structures via laser—is achieved through the providing of an interferometric system comprising an optical measurement path arranged along a line or a direction of measurement, at least partly integrated in the working head of the machine, and an optical reference path associated with the optical measurement path, which may also be integrated in the working head or be external to it, wherein the optical measurement path is reflected or scattered by a back-reflecting surface of an optical element associated with the optical transport path of the processing optical radiation of the machine tool—for example, the optical transport path of the laser beam—or by a surface of an object external to the machine—for example, a piece or a material being processed.

The realization of an additional optical measurement or reference path, multiplexed with a main optical measurement or reference path, allows an extending of the range of distances which can be measured or a compensating of a main measurement affected by perturbations with an additional calibration measurement. In particular, in the context of a machine for the laser processing of a piece or material, the realization of an additional optical measurement or reference path, multiplexed with a main optical measurement or reference path, allows an extending of the range of separation distances which can be measured or a compensating of the measurement of separation distances between the working head and the surface of the piece or material which is affected by perturbations due to the variation of at least one physical parameter of the transmission means within which the optical measurement path runs.

More generally, by the term "optical element associated with the optical transport path of the processing optical radiation" is meant an element of a system of optical elements arranged along a predetermined line of measurement associated with the system.

BRIEF DESCRIPTION OF THE FIGURES

Further characteristics and advantages of the invention shall be explained in greater detail in the following detailed specification of one embodiment, given as a nonlimiting example, making reference to the appended drawings, in which.

DETAILED DESCRIPTION

Figure 1:
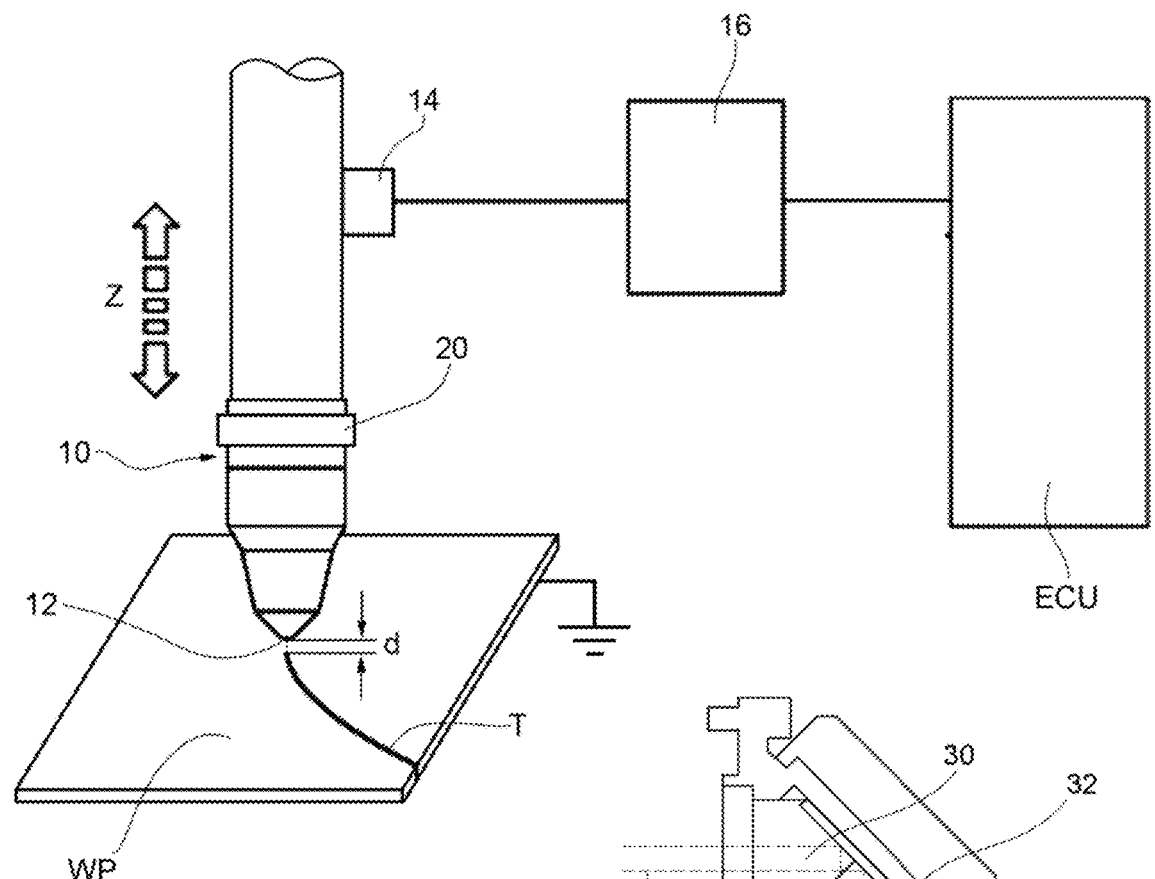
FIG. 1 shows an exemplary diagram of a working head of a machine tool near a piece being processed, and respective control means, according to the prior art.
Figure 2:
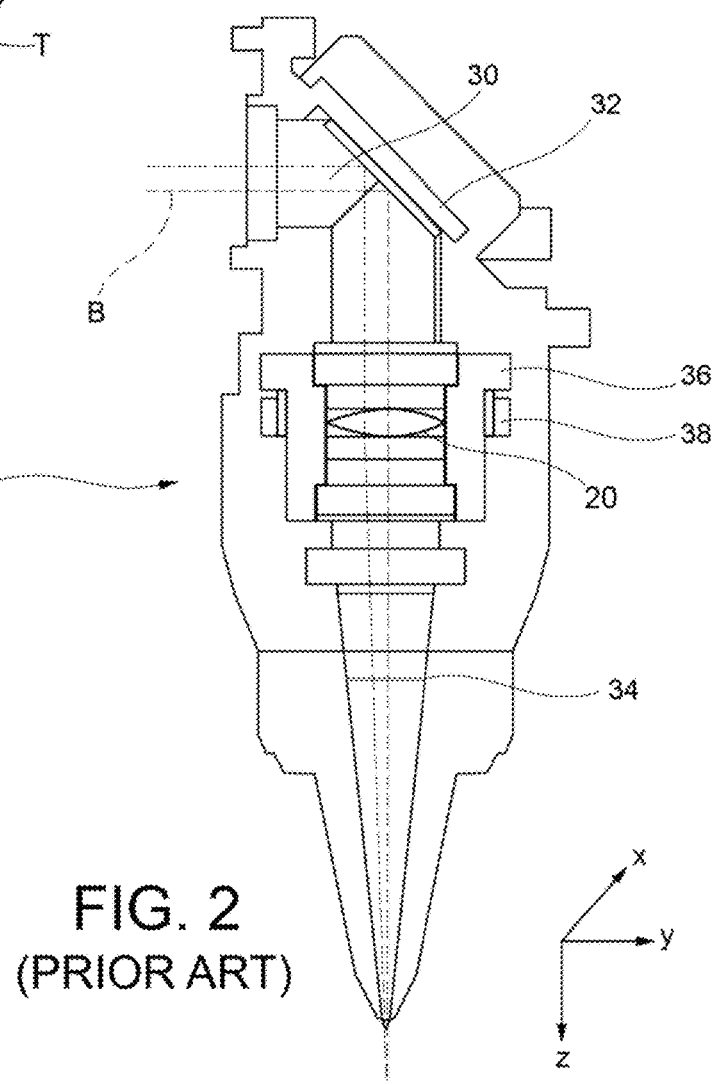
FIG. 2 shows an exemplary diagram of a working head of a laser machine, according to the prior art.

FIGS. 1 and 2 have been described previously making reference to the prior art, and their contents are understood as being claimed here inasmuch as they are common to the realization of a machine tool controlled to implement a method according to the teaching of the present invention.

Figure 3A:
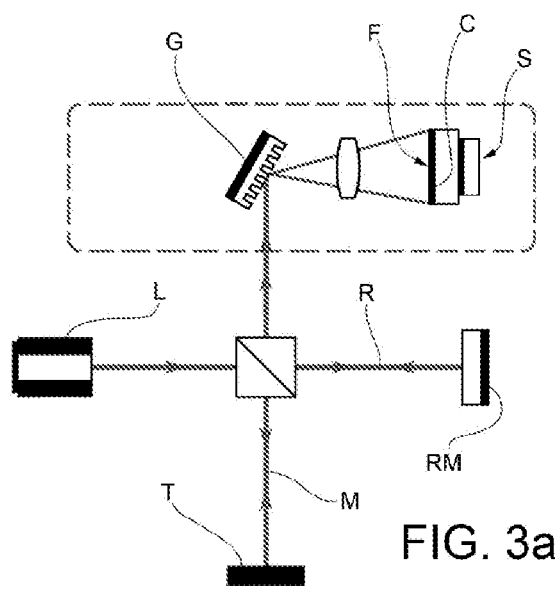
FIG. 3a shows schematically the configuration of a low-coherence interferometric system with detection in the frequency domain.

FIG. 3a shows schematically the Michelson configuration of a low-coherence interferometric system with detection in the frequency domain. A collimated beam of optical measurement radiation, denoted M, coming from an objective lens T, and a collimated beam of the same optical reference radiation, denoted R, coming from a reference reflective element RM—both of them originating at a source L—impinge in superpositioning on a diffraction grating G, and from here the spectral distribution of the interfering beams reaches via a focusing lens a region of common incidence C of a sensor device S, forming an interference fringe pattern F, shown in FIG. 3b.

The sensor device S comprises, for example, an arrangement of photodetectors along at least one illumination axis of the region of incidence (x axis in the figure). The arrangement of photodetectors is a linear or two-dimensional arrangement of photodetectors, preferably a linear arrangement. The illumination axis of the region of incidence is determined by the intersection of the plane defined by the angle of incidence of the measurement beam M and the reference beam R and the sensory surface of said sensor device.

Figure 3B:
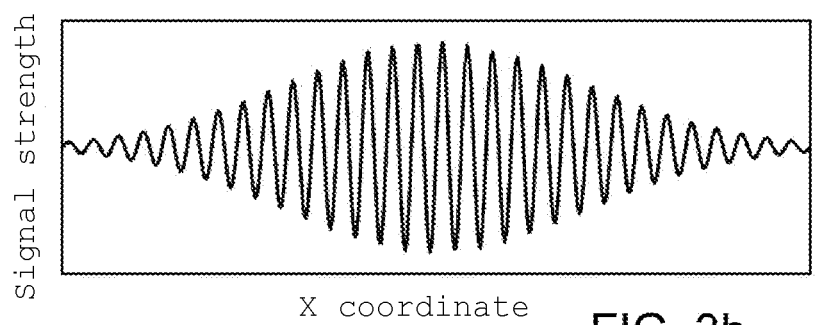
FIG. 3b shows an interference fringe pattern F localized on an illumination axis of a sensor device of the interference fringe pattern prior to dispersion in the wavelengths.
Figure 3C:
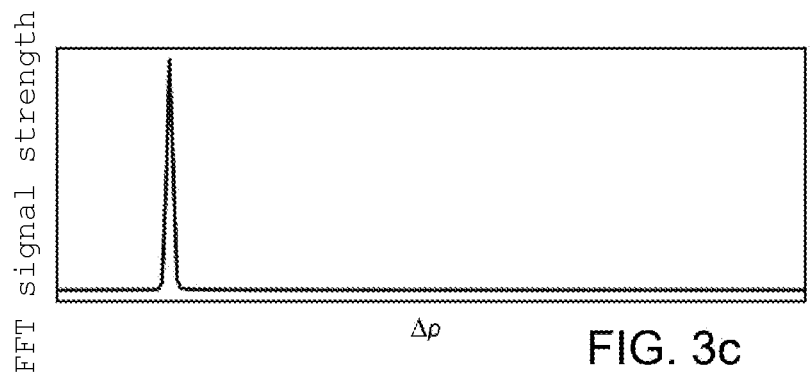
FIG. 3c shows the relation between the frequency of the interference fringes and the difference of optical lengths of the measurement and reference paths.

FIG. 3c shows the result of the processing of the acquisition of the interference fringe pattern by the photodetectors, where the spectrum of the interfering beams has been extracted from the signal strength profile of FIG. 3b and the frequency of the fringes has been determined by an FFT algorithm, depending as is known on the phase difference of the interfering beams, or the corresponding difference $\Delta p$ in optical lengths of the measurement and reference paths.

Figure 4A:
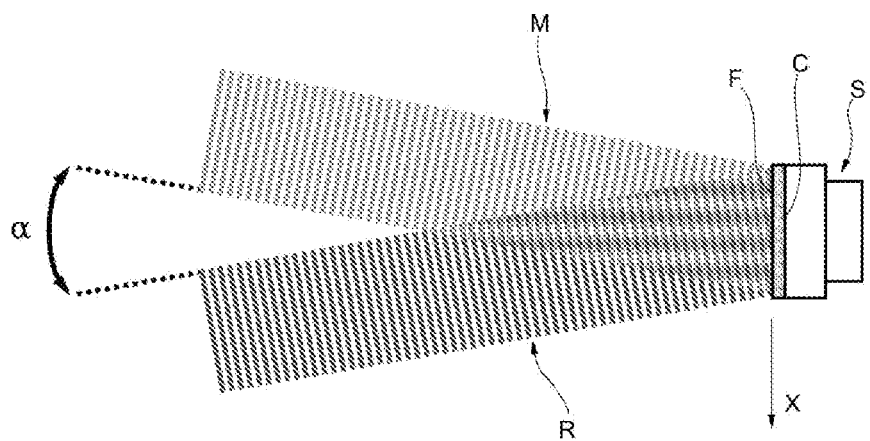
FIG. 4a shows schematically the configuration of a low-coherence linear interferometric system with detection in the space domain.

FIG. 4a shows schematically the configuration of a low-coherence interferometric system with linear spatial detection. A collimated beam of optical measurement radiation, denoted M, and a collimated beam of the same optical reference radiation, denoted R, impinge in superpositioning on a region of common incidence C of a sensor device S, at a predetermined angle of incidence $\alpha$, where they form an interference fringe pattern F whose extension in the region of common incidence is on the order of the coherence length of the optical radiation. The width of the collimated beam of optical radiation and the width of the collimated beam of optical reference radiation are preferably such as to substantially illuminate the entire sensor device. To increase the strength and the contrast of the signal detected, the beams may be concentrated on the sensor along a direction perpendicular to the illumination axis, for example, by means of a cylindrical focusing lens.

The sensor device S comprises, for example, an arrangement of photodetectors along at least one axis of illumination of the region of incidence (x axis in the figure). The arrangement of photodetectors is a linear or two-dimensional arrangement of photodetectors, preferably a linear arrangement. The axis of illumination of the region of incidence is determined by the intersection of the plane defined by the angle of incidence of the measurement beam M and the reference beam R and the sensing surface of said sensor arrangement.

Figure 4B:
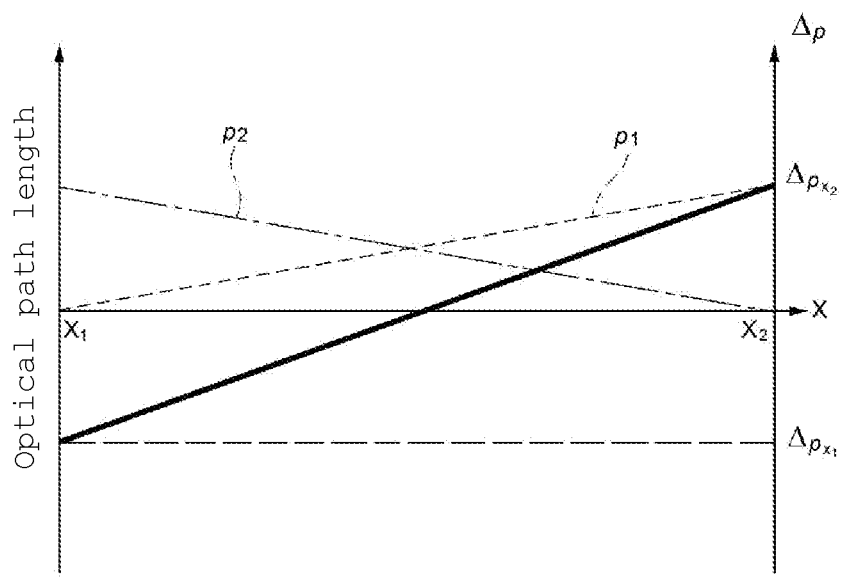
FIG. 4b shows schematically the variation of the lengths of the optical measurement and reference paths with respect to the relative point of incidence on an illumination axis of a sensor device of the interference fringe pattern.

In FIG. 4b, the diagram shows schematically the variation of the lengths p of the optical measurement and reference paths, referring to the initial wave front of incidence of the respective measurement and reference beams on the region of common incidence of the sensor arrangement S, in the typical case of a symmetrical configuration of the two beams incident on the sensor arrangement. Along the abscissa is indicated the position or x coordinate along the axis of illumination of the arrangement of photodetectors. By p1 is indicated the additional length of a first optical path, for example, the optical measurement path of the optical radiation measurement beam M, with respect to the initial point of incidence of the wave front of the measurement beam M at a first end of the region of common incidence C, $x_1$, the origin of the measurement axis. By p2 is indicated the additional length of a second optical path, for example, the optical reference path of the optical radiation reference beam R, with respect to the initial point of incidence of the wave front of the reference beam R at a second end of the region of common incidence, $x_2$, opposite the first one. By $\Delta p$ is indicated the difference between the additional lengths of the two paths, p1−p2, which is zero at the median coordinate of the sensor arrangement of photodetectors, and which varies from a value $\Delta p_{x1}$ at the end $x_1$ of the region of common incidence to a value $\Delta p_{x2}$ at the end $x_2$ of the region of common incidence.

Figure 4C:
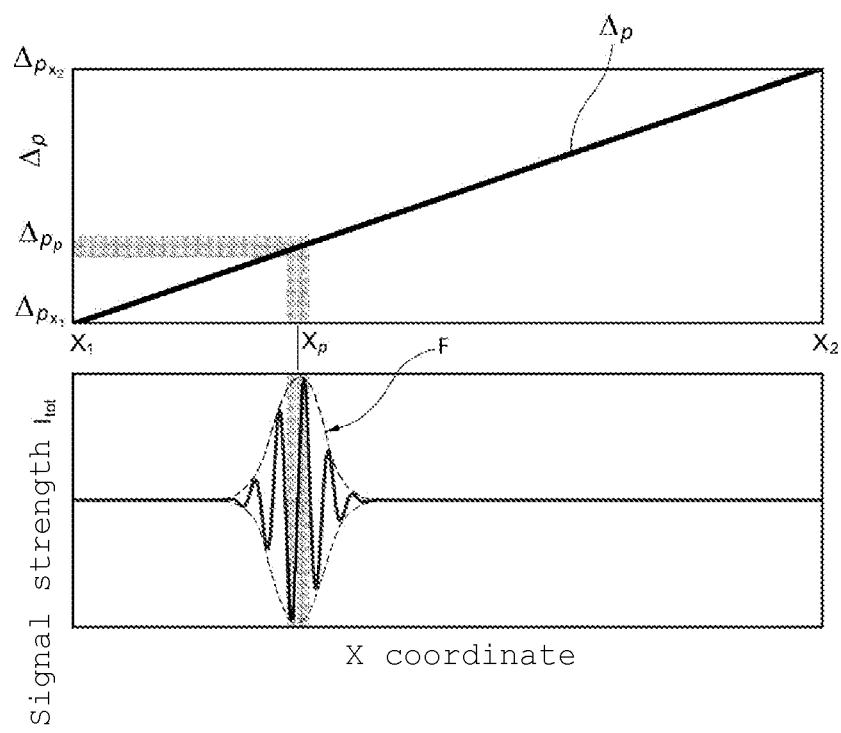
FIG. 4c shows schematically (upper diagram) the variation of the difference between the lengths of the optical measurement and reference paths with respect to the relative point of incidence on an illumination axis of a sensor device of the interference fringe pattern, and the localization of an interference fringe pattern on the illumination axis of the sensor device in a condition of equality of the optical lengths of the measurement and reference paths (lower diagram)

In FIG. 4c, the upper diagram shows the curve $\Delta p$ corresponding to the diagram of FIG. 4b, and the lower diagram shows the location of an interference fringe pattern F on the axis of illumination (x) of the sensor arrangement S which is obtained in a condition of equality of the optical lengths of the measurement and reference paths. The envelope of the interference fringe pattern F is shown by dashed lines, and in the upper diagram the coordinate of the peak of the envelope, $x_p$, is associated with the respective difference between the additional lengths of the paths of the optical measurement and reference beams, $\Delta p_p$.

What follows are remarks applicable to the determination of the relative position of an optical element through the interferometric technique with detection in the space domain.

There are indicated by $P_M$ and $P_R$ the measurement and reference paths, whose overall lengths may be expressed as $P_M=P1+p1$ and $P_R=P2+p_2$, where P1 is the optical length of the optical measurement path from the source of low-coherence optical radiation to the first wave front impinging on the sensor arrangement, and P2 is the optical length of the optical reference path from the same source of low-coherence optical radiation to the first wave front impinging on the sensor arrangement, being preferably constant. It is possible to consider P1 as being composed of $P_{head}+D_{standoff}$, where $P_{head}$ is the length of the optical path upstream and within the working head, including a first segment contained between the source of low-coherence optical radiation and the end of the processing tool or the measuring instrument carried by the working head, being proximal to the piece or material being processed WP (for example, the output of the laser beam), and a second segment contained between said proximal end of the processing tool or measuring instrument (such as the output of the laser beam) and the sensor arrangement S, these segments having a respective predetermined and invariant geometrical length, and $D_{standoff}$ is the separation distance in free air between the end of the processing tool or the measuring instrument proximal to the piece of material being processed WP and the surface of that material. P2 is the optical length of the optical reference path, which is equivalent to the optical length of the optical measurement path in a nominal operating condition, indicated hereafter as $P1_{nom}$, where the distance between the end of the processing tool or the measuring instrument (such as the output of the laser beam) and the surface of the piece or material WP corresponds to a predetermined nominal separation distance $D_{standoff\_nom}$.

The difference in optical length between the optical measurement path and the optical reference path is represented mathematically as:

$P_M-P_R$ and the interference fringes appear in the condition when this is zero, or:

$P_M-P_R=0$ which relation may be broken down into:

$P1+p1-(P2+p2)=0$ which may also be written as:

$P_{nom}+d+p1-P2-p2=0$ from which:

$P_{nom}+d-P2+\Delta p=0$ $P_{nom}+d-P_{nom}+\Delta p=0$ $\Delta p=-d$ that is, the current position of the optical element is equal to the difference between the additional lengths of the optical measurement path and the optical reference path.

Therefore, the current local position of an optical element with respect to its nominal local position, determined by a difference in optical length between the optical measurement path and the optical reference path, can be expressed as a difference between the additional lengths of the optical measurement path and the optical reference path, and thus as a displacement of the interference fringe pattern along the axis of illumination x of the sensor arrangement S with respect to a nominal position, for example, the median plane of the sensor arrangement S itself.

What follows are remarks applicable to the determination of the separation distance between a processing tool or a measuring instrument and the surface of an object external to it by using the interferometric technique with detection in the space domain.

There are indicated by $P_M$ and $P_R$ the measurement and reference paths, whose overall lengths may be expressed as $P_M=P1+p1$ and $P_R=P2+p2$, where P1 is the optical length of the optical measurement path from the source of low-coherence optical radiation to the first wave front impinging on the sensor arrangement, and P2 is the optical length of the optical reference path from the same source of low-coherence optical radiation to the first wave front impinging on the sensor arrangement, being preferably constant. It is possible to consider P1 as being composed of $P_{head}+D_{standoff}$, where head $P_{head}$ is the length of the optical path upstream and within the working head, including a first segment contained between the source of low-coherence optical radiation and the end of the processing tool or the measuring instrument carried by the working head, being proximal to the piece or material being processed WP (for example, the output of the laser beam 32), and a second segment contained between said proximal end of the processing tool or measuring instrument (such as the output of the laser beam 32) and the sensor arrangement S, these segments having a respective predetermined and invariant geometrical length, and $D_{standoff}$ is the separation distance in free air between the end of the processing tool or the measuring instrument proximal to the piece of material being processed WP and the surface of that material. P2 is the optical length of the optical reference path, which is equivalent to the optical length of the optical measurement path in a nominal operating condition, indicated hereafter as $P1_{nom}$, where the distance between the end of the processing tool or the measuring instrument (such as the output of the laser beam 32) and the surface of the piece or material WP corresponds to a predetermined nominal separation distance $D_{standoff\_nom}$.

The difference in optical length between the optical measurement path and the optical reference path is represented mathematically as:

$$P_M - P_R$$

and the interference fringes appear in the condition when this is zero, or:

$$P_M - P_R = 0$$

which relation may be broken down into:

$$P1 + p1 - (P2 + p2) = 0$$

which may also be written as:

$$P_{head} + D_{standoff} + p1 - P2 - p2 = 0$$

from which:

$$P_{head} + D_{standoff} - P2 + \Delta p = 0$$

$$P_{head} + D_{standoff} - P1_{nom} + \Delta p = 0$$

$$P_{head} + D_{standoff} - P_{head} - D_{standoff\_nom} + \Delta p = 0$$

$$\Delta p = D_{standoff\_nom} - D_{standoff}$$

that is, the difference between (a) the current separation distance between the end of the processing tool or measuring instrument and the surface of the material in the processing area, $D_{standoff}$, and (b) the nominal separation distance, $D_{standoff\_nom}$, is equal to the difference between the additional lengths of the optical measurement path and the optical reference path.

Therefore, a current separation distance between the end of the processing tool or the measuring instrument and the surface of the piece or material WP different from the nominal separation distance, determined by a difference in optical length between the optical measurement path and the optical reference path, can be expressed as a difference between the additional lengths of the optical measurement path and the optical reference path, and thus as a displacement of the interference fringe pattern along the axis of illumination x of the sensor arrangement S with respect to a nominal position, for example, the median plane of the sensor arrangement S itself, or a displacement of the frequency of the interference fringe pattern in the domain of the Fourier transform of the spectrum showing the interference fringes with respect to a predetermined nominal position.

It is noted that in an application of laser cutting or drilling in which an assist gas flow is involved, the end of the working head proximal to the piece or material being processed is generally the terminal section of the assist gas nozzle, while in an application of welding or additive manufacturing without supplying gas, the end of the working head proximal to the material being processed is generally the output of the working laser beam.

In the application of the invention, the length of the optical reference path is established in such a way as to correspond to the length of the optical measurement path at a predetermined nominal separation distance between the processing tool or the measuring instrument and the surface of the piece or material in the processing area, and the difference between (a) the current separation distance between the processing tool or the measuring instrument and the surface of the material in the processing area and (b) the predetermined nominal separation distance results from the difference in length between the optical measurement path and the optical reference path, which can be expressed as a function of the position of the interference fringe pattern along the axis of illumination of the region of incidence of the sensor arrangement S. Advantageously, a median position of the interference fringe pattern along the axis of illumination corresponds to this predetermined nominal separation distance. As an alternative, an extreme position of the interference fringe pattern along the axis of illumination may correspond to a null nominal separation distance between a nozzle and the material being processed, equivalent to the contact between the nozzle constituting the proximal end of the head and the material, and the separation distance between them can only increase, such that the interference fringe pattern only moves toward the opposite end of the axis of illumination. Analogously, by using an interferometry technique with detection of the interference fringe pattern in the frequency domain, the predetermined nominal separation distance corresponds to the median or extreme position of the interferometric signal peak in the space of the Fourier transform of the spectrum presenting the interference fringes.

Making reference to the lower diagram of FIG. 4c, the position $x_p$ of the interference fringe pattern along the axis of illumination is the intrinsic position of the envelope of the optical radiation intensity of said interference fringe pattern, and this intrinsic position of the envelope of the optical radiation intensity of said interference fringe pattern is—for example—the position of the peak or maximum intensity of the envelope of the optical radiation, or the mean of the position of the photodetectors weighted with the optical intensity of the fringe envelope.

The detection of the fringe envelope may be done by techniques of demodulation of the optical intensity profile, for example, by the use of a pass band spatial filter, or high pass and low pass filters in sequence, so as to reveal only the signal components corresponding to the spatial frequency of the interference fringes. For example, in a first phase of data processing for the optical intensity, the optical intensity detected by a sensor array is integrated along the direction perpendicular to the development direction of the interference fringe, for example, by columns of a sensor array oriented so as to receive an interference fringe pattern vertically aligned (this operation is not required if the sensor arrangement is a linear arrangement of photodetectors on which the beams are focused by means of a cylindrical lens). The signal generated by the photodetectors is then normalized with respect to a background signal, for example, one extracted from an image lacking interference fringes. A high pass spatial filtering is then done, for example, at ⅕ the spatial frequency of the photodetectors, to remove the baseline and retain the interference fringe pattern. Since a signal oscillating around zero is obtained in this way, the absolute value is extracted from the signal and then a low pass spatial filtering is applied, for example at ¹⁄₂₅ of the spatial frequency of the photodetectors, to extract the envelope of the interference fringe pattern. The position of the interference fringe pattern is finally obtained by detecting the position of the envelope of the fringe pattern, finding the maximum from this, or by comparing the envelope with a predetermined model function (for example, a Gaussian function) and extracting the peak from the model function.

Figure 5:
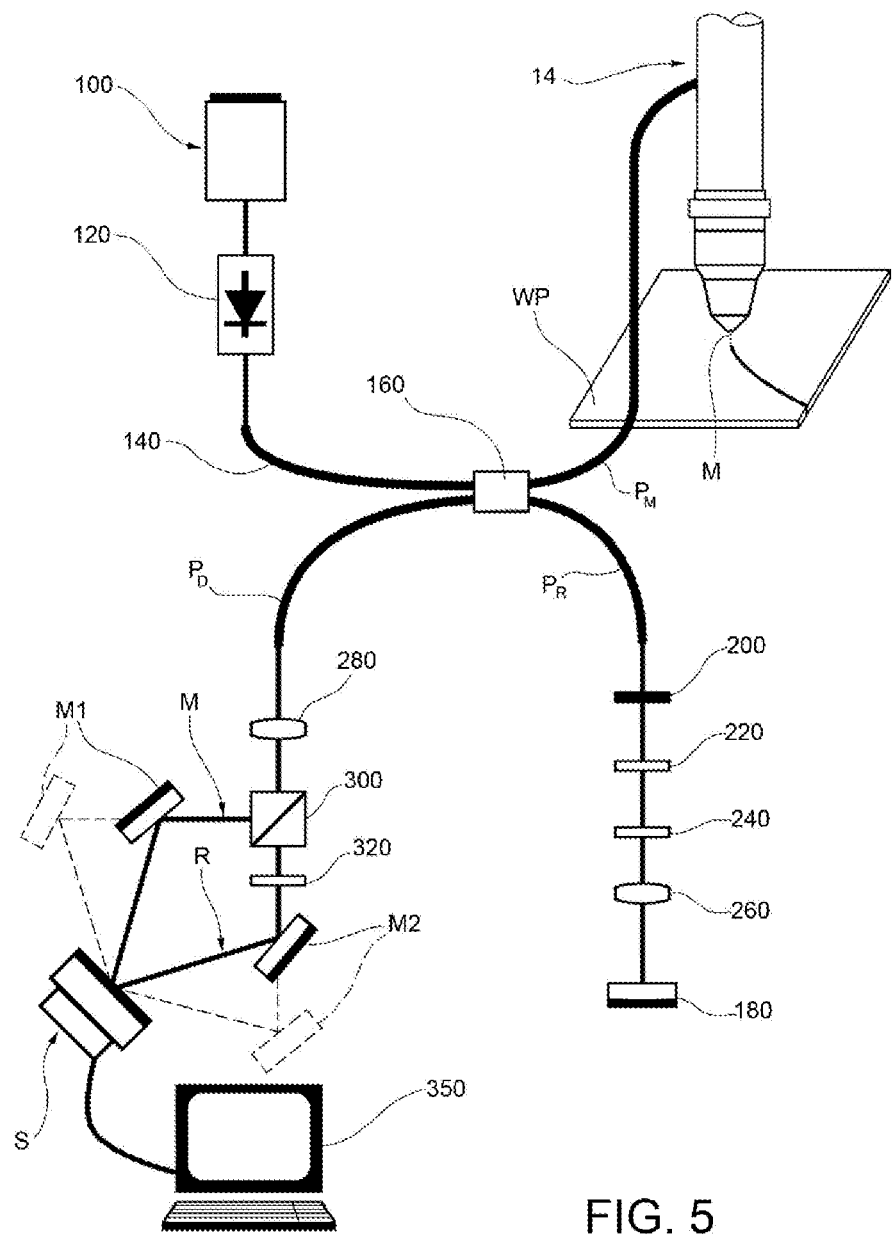
FIG. 5 shows an exemplary diagram of a system for the determination of the separation distance between a working head of a machine for the laser processing of a material and the surface of the material.

FIG. 5 shows a diagram exemplifying a system for the determination of the separation distance between a working head 10 of a machine for laser processing of a piece or material WP and the surface of the piece or material itself, according to a currently preferred embodiment.

In the figure, 100 denotes a source of low-coherence optical radiation, preferably of linear polarization, such as an LED or light-emitting diode, for example one operating in the wavelength range of visible or near infrared light. The optical radiation emitted by the source 100, downstream from an appropriate optical isolator 120, is injected into an optical waveguide, such as an optical fiber 140, and taken to a beam splitter 160 able to generate a beam of optical measurement radiation M, routed on an optical measurement path $P_M$, and a beam of optical reference radiation R, routed on an optical reference path $P_R$.

The optical measurement path $P_M$ and the optical reference path $P_R$ are guided paths and they include optical guides (for example, optical fibers) able to maintain the unvaried polarization of the beam along the entire path.

The optical measurement path $P_M$ is taken to the working head 10 of a machine for the laser processing of a piece or material, as described above, and from here it goes toward the piece or material being processed WP, on which it impinges. The output cross section of the measurement beam M corresponds to the cross section of the measurement head used to measure the distance from said material, for example, the aperture of the nozzle for dispensing of the assist gas flow, or the output of the laser beam.

The optical reference path $P_R$ on the other hand is taken to a back-reflecting element 180, preferably across the interpositioning of an optical density filter 200, an optical element for compensation of the dispersion 220, a λ/4 plate 240, and a focusing lens 260. The optical reflecting element 180 is arranged along the optical reference path in such a way that the optical length of this path from the beam splitter 160 to the reflecting optical element 180 corresponds to the optical length of the optical measurement path from the beam splitter 160 to the (reflecting) surface of the piece or material being processed WP in an operating condition where said surface is located at the predetermined nominal separation distance $D_{standoff\_nom}$ from the working head, or from the end of the working head proximal to the piece or material, such as the aperture of the assist gas nozzle or the beam output.

The optical measurement and reference paths $P_M$, $P_R$ are such that the optical radiation travels along them in both directions, returning to the beam splitter 160 after the reflection, respectively on the surface of the piece or material being processed WP and on the reflecting optical element 180. In the optical reference path $P_R$, the double passage of the reference beam R through the λ/4 plate 240 determines a 90° rotation of the linear polarization of the beam, which thus takes on a linear polarization orthogonal to the linear polarization of the measurement beam M. The beam splitter 160 thus produces a recombination of the optical measurement beam and the optical reference beam and routes them, superimposed, along an optical detection path $P_D$ (common to a segment of the optical measurement path and a segment of the optical reference path) toward the sensor arrangement S.

Both the optical measurement and reference beams are taken through a cylindrical focusing lens 280, able to focus the collimated beam along a single direction, in particular, the direction orthogonal to the axis of illumination of the sensor arrangement, for the purpose of concentrating the signal along this axis, thus optimizing the illumination of the photodetectors, and they arrive at a polarizing beam splitter 300, which produces the separation of the optical measurement beam M from the optical reference beam R based on their polarization, routing the first of these toward a first reflecting element M1 and the second of these toward a second reflecting element M2, in the latter case across the interpositioning of a λ/2 plate 320 able to restore the original polarization. Thanks to this configuration, the first and the second reflecting element M1, M2 respectively direct the optical measurement beam and the optical reference beam toward the sensor arrangement S, more precisely toward the common region of incidence of the sensor arrangement, at an angle of incidence α. The angle of incidence α is advantageously controllable within a predetermined range of values in one embodiment of the system, where the reflecting elements M1 and M2 are movable, respectively in translation along the axis of propagation of the respective optical beam and in rotation about an axis normal to the plane of incidence (dashed-line position in the figure).

Of course, in one embodiment based on an interferometric technique with detection of the interference fringe pattern in the frequency domain, the optical detection path $P_D$ does not involve a separation of the measurement and reference beams once more, but instead comprises a spectrometer according to the architecture described in FIG. 4a.

As described above, the sensor arrangement S comprises a plurality of photodetector devices, each of which is able to emit a respective signal representative of the optical intensity impinging on it, and the totality of these signals is transmitted to processing means 350 adapted to identify an interference fringe pattern F which is established in the region of common incidence C of the sensor arrangement through the acquisition of the overall incident optical power of the superimposed optical measurement beam and the optical reference beam.

Preferably, the optical measurement path and the optical reference path include corresponding optical elements, and in particular the optical reference path includes a back-reflecting element whose optical scattering and reflection properties correspond as much as possible to the optical scattering and reflection properties of the surface of the piece or material which is interposed in the optical measurement path. Optionally, optical attenuator means may be provided, able to balance the intensity of the optical reference radiation reflected by said back-reflecting element with respect to the intensity of the optical measurement radiation reflected by the piece or material being processed.

Generalizations of the system of FIG. 5 coming under the scope of the present invention are at least the following.

A system for the determination of the relative position of an element of an optical system of an assembly for processing or measurement of an object along a predetermined measurement line associated with the system, comprising:
means for generating a beam of low-coherence optical measurement radiation;
means for propagation of the measurement beam, able to take the measurement beam along the measurement line toward said element, and to take the measurement beam reflected or scattered by a back-reflecting surface of said element on which the measurement beam impinges with at least partial back-reflection, toward an interferometric optical sensor arrangement, in which the measurement beam travels on an optical measurement path from a respective source to the sensor arrangement, including a first segment contained between the source and the back-reflecting surface of said element and a second segment contained between the back-reflecting surface of said element and the sensor arrangement, having a respective predetermined nominal geometrical length when said element is situated in a predetermined nominal position corresponding to a predetermined operating condition of the system, means for generating a respective beam of said low-coherence optical reference radiation;

means for the propagation of the reference beam, able to take the reference beam toward the sensor arrangement, wherein the reference beam comprises a main reference beam resulting from traveling on a main optical reference path of optical length, or optical path, equivalent to the optical length of the optical measurement path in a nominal operating condition in which the position of said element is the predetermined nominal position, and at least one additional multiplexed reference beam resulting from traveling on an additional optical reference path having a geometrical length different from the geometrical length of the main optical reference path in an operating condition in which the position of said element is a predetermined modified position;

wherein the means of propagation of the measurement beam and the means of propagation of the reference beam are adapted to superimpose the measurement beam and the reference beam at least in one region of common incidence of the sensor arrangement, along a predetermined axis of illumination;

detector means, arranged along the axis of illumination in the region of common incidence, able to detect the position of a main interference fringe pattern between the measurement beam and the main reference beam, wherein the extension of the interference fringe pattern along the axis of illumination corresponds to the coherence length of the low-coherence optical radiation, and that of an additional interference fringe pattern between the measurement beam and the additional reference beam having (i) a peak or maximum intensity of the envelope of the optical radiation different from the peak or maximum intensity of the envelope of the optical radiation of the main interference fringe pattern, or (ii) an intrinsic position of the envelope of the intensity of the optical radiation of the main interference fringe pattern, or (iii) a spatial frequency different from the spatial frequency of the main interference fringe pattern, or alternatively detector means arranged in the region of common incidence, able to detect the frequency of a fringe pattern in the spectrum of the wavelengths obtained from the main interference between the measurement beam and the main reference beam, obtained by wavelength dispersion of the beams, whose extension in the frequency domain is determined by the coherence length of the low-coherence optical radiation, and an additional interference fringe pattern between the measurement beam and the additional reference beam (i) having a frequency different from the frequency of the main interference fringe pattern, or (ii) determined by the superpositioning of the measurement and additional reference beams in a zone of the common region different from the zone of superpositioning of the measurement and main reference beams; and processing means adapted to determine a difference in optical length between the optical measurement path and the optical reference path or the additional optical reference path—indicative of a difference between (a) the current position of said element and (b) the predetermined nominal position, or the predetermined modified nominal position, respectively, of said element along the axis of the measurement beam—as a function of the position of the interference fringe pattern or the additional interference fringe pattern, respectively, along the axis of illumination of the region of incidence, or of the frequency of the interference fringe pattern or the additional interference fringe pattern in the frequency domain.

Alternately, or in combination, the system for the determination of the relative position of an element of an optical system of an assembly for processing or measurement of an object along a predetermined measurement line associated with the system, comprises:

means for generating a beam of low-coherence optical measurement radiation;

means for propagation of the measurement beam, able to take the measurement beam along the measurement line toward said element, and to take the measurement beam reflected or scattered by a back-reflecting surface of said element on which the measurement beam impinges with at least partial back-reflection, toward an interferometric optical sensor arrangement, in which the measurement beam travels on an optical measurement path from a respective source to the sensor arrangement, including a first segment contained between the source and the back-reflecting surface of said element and a second segment contained between the back-reflecting surface of said element and the sensor arrangement, having a respective predetermined nominal geometrical length when said element is situated in a predetermined nominal position corresponding to a predetermined operating condition of the system, and comprising a main measurement beam resulting from the traveling on a main optical measurement path with transmission through each optical element interposed upstream from said element along the measurement line, and an additional multiplexed measurement beam resulting from traveling on an additional optical measurement path having a geometrical length different from the geometrical length of the main optical measurement path;

means for generating a respective beam of said low-coherence optical reference radiation;

means for the propagation of the reference beam, able to take the reference beam toward the sensor arrangement, wherein the reference beam travels an optical reference path of optical length equivalent to the optical length of the main optical measurement path in a nominal operating condition in which the position of said element is the predetermined nominal position;

wherein the means of propagation of the measurement beam and the means of propagation of the reference beam are adapted to superimpose the measurement beam and the reference beam at least in one region of common incidence of the sensor arrangement, along a predetermined axis of illumination;

detector means, arranged along the axis of illumination in the region of common incidence, able to detect the position of a main interference fringe pattern between the main measurement beam and the reference beam, wherein the extension of the interference fringe pattern along the axis of illumination corresponds to the coherence length of the low-coherence optical radiation, and that of an additional interference fringe pattern between the additional measurement beam and the reference beam having (i) a peak or maximum intensity of the envelope of the optical radiation different from the peak or maximum intensity of the envelope of the optical radiation of the main interference fringe pattern, or (ii) an intrinsic position of the envelope of the intensity of the optical radiation differing from the intrinsic position of the envelope of the intensity of the optical radiation of the main interference fringe pattern, or (iii) a spatial frequency different from the spatial frequency of the main interference fringe pattern, or alternatively detector means arranged in the region of common incidence, able to detect the frequency of a fringe pattern in the spectrum of the wavelengths obtained from the main interference between the main measurement beam and the reference beam, obtained by wavelength dispersion of the beams, whose extension in the frequency domain is determined by the coherence length of the low-coherence optical radiation, and an additional interference fringe pattern between the additional measurement beam and the reference beam (i) having a frequency different from the frequency of the main interference fringe pattern, or (ii) determined by the superpositioning of the additional measurement and reference beams in a zone of the common region different from the zone of superpositioning of the main measurement and reference beams; and processing means adapted to determine a difference in optical length between the optical measurement path or the additional optical measurement path and the optical reference path—indicative of a difference between (a) the current position of said element and (b) the predetermined nominal position of said element along the axis of the measurement beam—as a function of the position of the interference fringe pattern or the additional interference fringe pattern, respectively, along the axis of illumination of the region of incidence, or of the frequency of the interference fringe pattern or the additional interference fringe pattern in the frequency domain.

A system for the determination of the separation distance between a processing tool or a measuring instrument and an at least partly reflecting surface of an object external to it, along a predetermined measurement line associated with at least one proximal portion of the tool or the instrument, respectively, with respect to the surface of the object, comprises:

means for generating a beam of low-coherence optical measurement radiation;

means for propagation of the measurement beam, able to take the measurement beam toward the surface of the object through the proximal portion of the tool or instrument, and to take the measurement beam reflected or scattered by the surface of the object through the proximal portion of the tool or instrument and toward an interferometric optical sensor arrangement, in which the measurement beam travels on an optical measurement path from a respective source to the sensor arrangement, including a first segment contained between the source and the proximal portion of the tool or instrument and a second segment contained between the proximal portion of the tool or instrument and the sensor arrangement, having a respective predetermined and invariant geometrical length;

means for generating a respective beam of said low-coherence optical reference radiation;

means for the propagation of the reference beam, able to take the reference beam toward the sensor arrangement, wherein the reference beam comprises a main reference beam resulting from traveling on a main optical reference path of optical length equivalent to the optical length of the optical measurement path in a nominal operating condition in which the distance between the proximal portion of the tool or instrument and the surface of the object corresponds to a predetermined nominal separation distance, and at least one additional multiplexed reference beam resulting from traveling on an additional optical reference path having a geometrical length different from the geometrical length of the main optical reference path in an operating condition in which the distance between the proximal portion of the tool or instrument and the surface of the object corresponds to a predetermined modified separation distance;

wherein the means of propagation of the measurement beam and the means of propagation of the reference beam are adapted to superimpose the measurement beam and the reference beam at least in one region of common incidence of the sensor arrangement, along a predetermined axis of illumination;

detector means, arranged along the axis of illumination in the region of common incidence, able to detect the position of a main interference fringe pattern between the measurement beam and the main reference beam, wherein the extension of the interference fringe pattern along the axis of illumination corresponds to the coherence length of the low-coherence optical radiation, and that of an additional interference fringe pattern between the measurement beam and the additional reference beam having (i) a peak or maximum intensity of the envelope of the optical radiation different from the peak or maximum intensity of the envelope of the optical radiation of the main interference fringe pattern, or (ii) an intrinsic position of the envelope of the intensity of the optical radiation different from the intrinsic position of the envelope of intensity of the optical radiation of the main interference fringe pattern, or (iii) a spatial frequency different from the spatial frequency of the main interference fringe pattern, or alternatively detector means arranged in the region of common incidence, able to detect the frequency of a fringe pattern in the spectrum of the wavelengths obtained from the main interference between the measurement beam and the main reference beam, obtained by wavelength dispersion of the beams, whose extension in the frequency domain is determined by the coherence length of the low-coherence optical radiation, and an additional interference fringe pattern between the measurement beam and the additional reference beam (i) having a frequency different from the frequency of the main interference fringe pattern, or (ii) determined by the superpositioning of the measurement beam and additional reference beam in a zone of the common region different from the zone of superpositioning of the measurement and main reference beams; and processing means adapted to determine a difference in optical length between the optical measurement path and the optical reference path or the additional optical reference path—indicative of a difference between (a) the current separation distance between the proximal portion of the tool or instrument and the surface of the object and (b) the predetermined nominal separation distance, or the predetermined modified separation distance, respectively, as a function of the position of the interference fringe pattern or the additional interference fringe pattern, respectively, along the axis of illumination of the region of incidence, or of the frequency of the interference fringe pattern or the additional interference fringe pattern in the frequency domain.

Alternately, or in combination, the system for the determination of the separation distance between a processing tool or a measuring instrument and an at least partly reflecting surface of an object external to it, along a predetermined measurement line associated with at least one proximal portion of the tool or the instrument, respectively, with respect to the surface of the object, comprises:

means for generating a beam of low-coherence optical measurement radiation;

means for propagation of the measurement beam, able to take the measurement beam toward the surface of the object through the proximal portion of the tool or instrument, and to take the measurement beam reflected or scattered by the surface of the object through the proximal portion of the tool or instrument and toward an interferometric optical sensor arrangement, in which the measurement beam travels on an optical measurement path from a respective source to the sensor arrangement, including a first segment contained between the source and the proximal portion of the tool or instrument and a second segment contained between the proximal portion of the tool or instrument and the sensor arrangement, having a respective predetermined and invariant geometrical length, and comprising a main measurement beam resulting from the traveling on a main optical measurement path with transmission through each optical element interposed upstream from said tool or instrument along the measurement line, and an additional multiplexed measurement beam resulting from traveling on an additional optical measurement path having a geometrical length different from the geometrical length of the main optical measurement path;

means for generating a respective beam of said low-coherence optical reference radiation;

means for the propagation of the reference beam, able to take the reference beam toward the sensor arrangement, wherein the reference beam travels on an optical reference path of optical length equivalent to the optical length of the main optical measurement path in a nominal operating condition in which the distance between the proximal portion of the tool or instrument and the surface of the object corresponds to a predetermined nominal separation distance;

wherein the means of propagation of the measurement beam and the means of propagation of the reference beam are adapted to superimpose the measurement beam and the reference beam at least in one region of common incidence of the sensor arrangement, along a predetermined axis of illumination;

detector means, arranged along the axis of illumination in the region of common incidence, able to detect the position of a main interference fringe pattern between the main measurement beam and the reference beam, wherein the extension of the interference fringe pattern along the axis of illumination corresponds to the coherence length of the low-coherence optical radiation, and that of an additional interference fringe pattern between the additional measurement beam and the reference beam having (i) a peak or maximum intensity of the envelope of the optical radiation different from the peak or maximum intensity of the envelope of the optical radiation of the main interference fringe pattern, or (ii) an intrinsic position of the envelope of the intensity of the optical radiation different from the intrinsic position of the envelope of intensity of the optical radiation of the main interference fringe pattern, or (iii) a spatial frequency different from the spatial frequency of the main interference fringe pattern, or alternatively detector means arranged in the region of common incidence, able to detect the frequency of a fringe pattern in the spectrum of the wavelengths obtained from the main interference between the main measurement beam and the reference beam, obtained by wavelength dispersion of the beams, whose extension in the frequency domain is determined by the coherence length of the low-coherence optical radiation, and an additional interference fringe pattern between the additional measurement beam and the reference beam (i) having a frequency different from the frequency of the main interference fringe pattern, or (ii) determined by the superpositioning of the additional measurement and reference beams in a zone of the common region different from the zone of superpositioning of the main measurement and reference beams; and processing means adapted to determine a difference in optical length between the optical measurement path or the additional optical measurement path and the optical reference path—indicative of a difference between (a) the current separation distance between the proximal portion of the tool or instrument and the surface of the object and (b) the predetermined nominal separation distance—as a function of the position of the interference fringe pattern or the additional interference fringe pattern, respectively, along the axis of illumination of the region of incidence, or of the frequency of the interference fringe pattern or the additional interference fringe pattern in the frequency domain.

By means of the system of FIG. 5, or equivalent systems, a method is implemented for the determination of the relative position of at least one optical element and a method is implemented for the determination of the separation distance between a processing tool or a measuring instrument and the surface of the piece or material WP at the areas of processing defined along a predetermined working trajectory T followed by the laser processing beam emitted from the head.

The method involves the generating of a beam of low-coherence main optical measurement radiation M which is taken along a measurement direction—or more generally a measurement line, if the spatial direction of the beam changes on the path—associated with a system or optical elements or at least one proximal portion of a processing tool or a measuring instrument of an external object. The beam is taken toward an element of said system or toward the surface of an object external to said tool or instrument, for example within the working head 10 of the machine tool, and—being reflected or scattered by a back-reflecting surface of said element or by the surface of the external object, on which it impinges with at least partial back-reflection—it is taken optionally through the proximal portion of the processing tool or the measuring instrument, toward the sensor arrangement S.

The main beam of optical measurement radiation M travels specifically on an optical measurement path from the source 100 to the sensor arrangement S, including two segments having a respective predetermined and invariant nominal geometrical length. In the case of determination of the relative position of an element of an optical system, the two segments have a respective predetermined and invariant nominal geometrical length when that element is located in a predetermined nominal position corresponding to a predetermined operating condition of said system.

In the case of determination of the relative position of an element of an optical system within the working head, the two segments include respectively a first segment comprised between said source and the back-reflecting surface of said element and a second segment comprised between said back-reflecting surface of said element and the sensor arrangement S.

In the case of determination of the separation distance between a processing tool or a measuring instrument and the surface of an object external to it, the two segments include respectively a first segment comprised between the source 100 and the portion of the processing tool or the measuring instrument proximal to the piece or material WP, and a second segment comprised between said portion proximal to the piece or material WP and the sensor arrangement S.

From the same source 100 there is generated a main reference beam R of said low-coherence optical radiation, which is also taken toward the sensor arrangement S. The main reference beam R travels on a reference optical path $P_R$ of optical length equivalent to the optical length of the optical measurement path $P_M$ in the nominal operating condition in which the position of the element of the optical system is the predetermined nominal position or in which the distance between the proximal portion of the processing tool or the measuring instrument and the surface of the piece or material WP corresponds to a predetermined nominal separation distance.

The measurement beam M and the reference beam R are superimposed in the region of common incidence C of the sensor arrangement S along a predetermined axis of illumination.

Using an interferometric technique with detection of the interference fringe pattern in the space domain, the position of an interference fringe pattern F between the measurement beam M and the reference beam R along the axis of illumination in the region of common incidence C is detected by the processing means 350 and makes it possible, as described above, to determine the difference in optical length between the optical measurement path $P_M$ and the optical reference path $P_R$, which is indicative of the difference between (a) the current position of said optical element and (b) the predetermined nominal position, or (a) the current separation distance between the proximal portion of the processing tool or the measuring instrument and the surface of the object and (b) the predetermined nominal separation distance.

Using an interferometric technique with detection of the interference fringe pattern in the frequency domain, the frequency of an interference fringe pattern F between the measurement beam M and the reference beam R obtained by wavelength dispersion of those beams along the axis of illumination in the region of common incidence C is detected by the processing means 350 and makes it possible, as described above, to determine the difference in optical length between the optical measurement path $P_M$ and the optical reference path $P_R$, which is indicative of the difference between (a) the current position of said element and (b) the predetermined nominal position, or between (a) the current separation distance between the proximal portion of the processing tool or the measuring instrument and the surface of the object and (b) the predetermined nominal separation distance.

To increase the interval of the difference between the lengths of the measurement and reference paths which can be measured by the technique described in the invention, or to acquire in parallel a supplemental measurement referring to a stable and undisturbed optical element which may serve for the compensation of a main measurement, according to the invention at least one additional optical measurement path is utilized, having a geometrical length different from the geometrical length of the main optical measurement path and/or at least one optical reference path having a predetermined geometrical length different from the geometrical length of the main optical reference path, in an operating condition in which the position of said element of the optical system is a predetermined modified position or in an operating condition in which the distance between the proximal portion of the processing tool or the measuring instrument and the surface of the object corresponds to a predetermined modified separation distance.

Figure 6A:
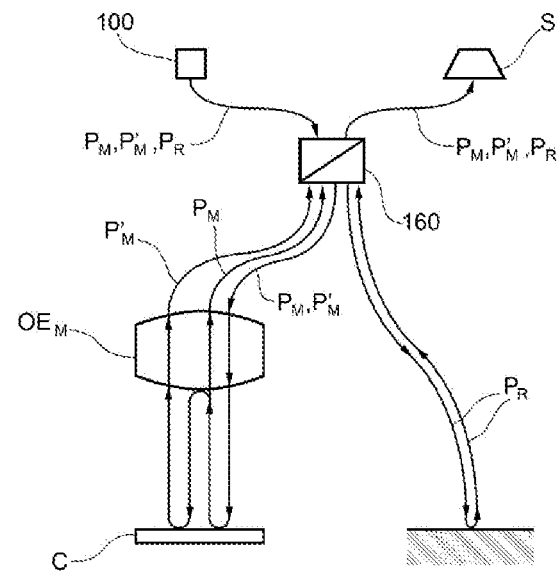
FIGS. 6a-6e are schematic representations of different possible combinations of a main optical measurement path, an additional optical measurement path, a main optical reference path and an additional optical reference path.

In one embodiment, shown in FIG. 6a, an additional optical measurement path $P'_M$ includes at least one partial back reflection at the surface of an optical element $OE_M$ interposed upstream from the element C subject to measurement (an element of the optical system inside the working head or the surface of an object undergoing processing or measurement), along the measurement line, for example, an optical element interposed along the optical path of the processing laser beam or the optical radiation measurement beam, with respect to the optical path of the main optical measurement path $P_M$, having a transmission through each optical element (not shown) interposed upstream from the element C subject to measurement.

Figure 6B:
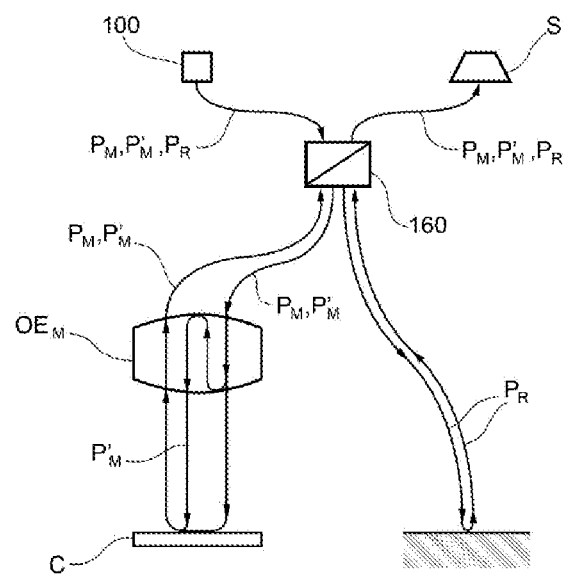

In an alternative embodiment, shown in FIG. 6b, an additional optical measurement path $P'_M$ includes at least one back reflection internal to the optical element $OE_M$ interposed along the optical path of the main measurement beam $P_M$.

Figure 6C:
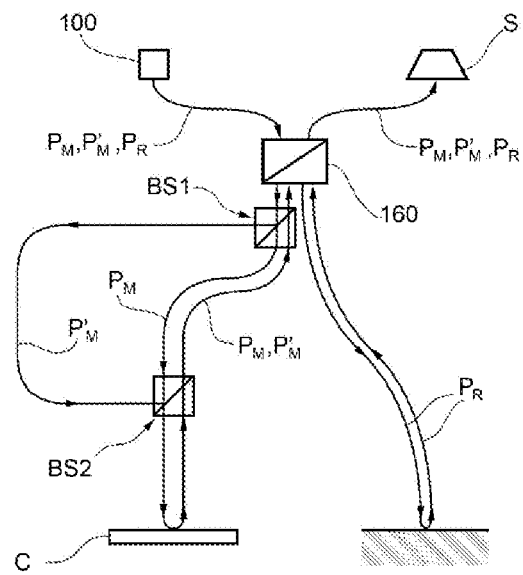

In an alternative embodiment, shown in FIG. 6c, an additional optical measurement path $P'_M$ includes one path segment which is deflected relative to the main optical measurement path $P_M$, for example, being obtained by interpositioning an optical element BS1 for partial extraction of the measurement beam M from the main optical measurement path $P_M$ and an optical element BS2 for reintroducing the extracted measurement beam M in the main optical measurement path $P_M$, said optical element BS 1 for partial extraction of the beam being—for example—a beam separating optical device or a prism able to control continuously the optical length of the deflected path segment. The extracting of the additional beam may occur by splitting the main beam into several parts, subdividing the intensity over several beams, or by utilizing different optical properties, for example, by separating components of different polarization. Alternatively, the separation of the beams may occur in front of the sensor arrangement, with no further recombination.

The main optical measurement path $P_M$ and the additional optical measurement path $P'_M$ are superimposed at least for one segment and impinge in a collinear manner on a region of common incidence of the sensor arrangement S, possibly on different respective areas of said region of incidence.

Figure 6D:
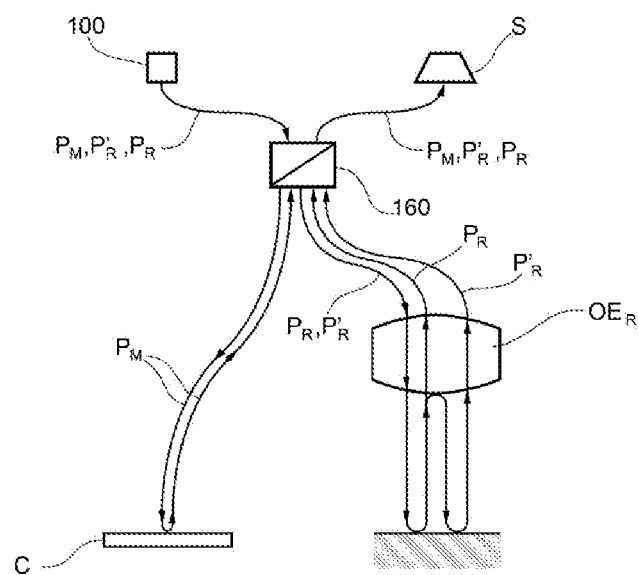
Figure 6E:
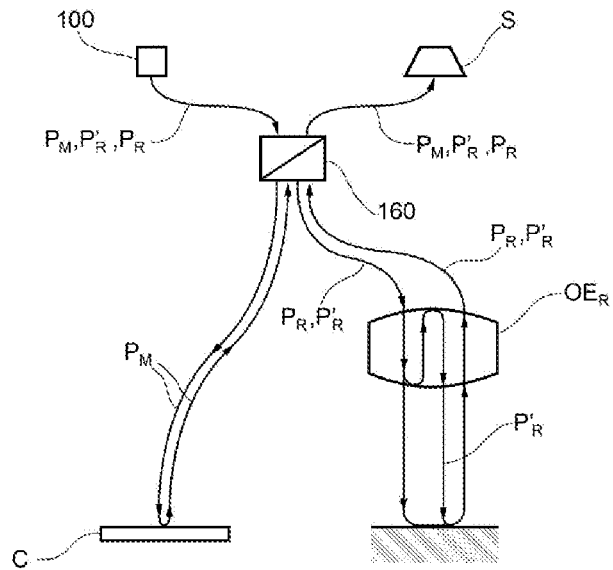

In one embodiment, shown in FIG. 6d, an additional optical reference path $P'_R$ includes at least one partial back reflection at the surface of an optical element $OE_R$ interposed along the main optical reference path $P_R$. In an alternative embodiment, shown in FIG. 6e, the additional optical reference path P'$_R$ includes at least one internal back reflection at an optical element OE$_R$ interposed along the main optical reference path P$_R$.

Figure 6F:
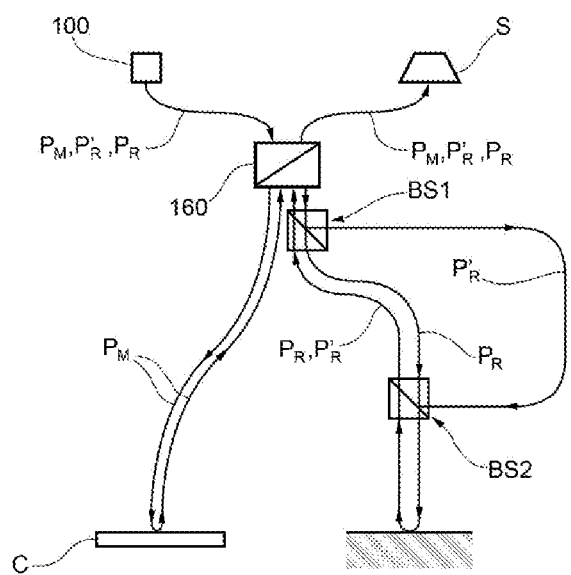

In an alternative embodiment, shown in FIG. 6f, the additional optical reference path P'$_R$ includes one path segment which is deflected relative to the main optical reference path P$_R$, for example, being obtained by interpositioning an optical element BS1 for partial extraction of the reference beam R from the main optical reference path P$_R$ and an optical element BS2 for reintroducing the extracted reference beam R in the main optical reference path P$_R$, said optical element BS1 for partial extraction of the beam being—for example—a beam separating optical device or a prism able to control continuously the optical length of the deflected path segment. The extracting of the additional beam may occur by splitting the main beam into several parts, subdividing the intensity over several beams, or by utilizing different optical properties, for example, by separating components of different polarization.

The main optical reference path P$_R$ and the additional optical reference path P$_R$ are superimposed at least for one segment and impinge in a collinear manner on a region of common incidence of the sensor arrangement S, possibly on different respective areas of said region of incidence.

The person skilled in the art will understand that the teaching above, referring separately to the optical measurement path and the optical reference path, may be combined into one possible embodiment.

The combination of the main and additional measurement and reference beams, reflected by elements of the optical chain (as exemplified in FIGS. 6a-6f) or by surfaces of objects external to this, makes possible parallel readings and therefore the invention can be utilized for many applications, including the applications shown schematically in FIGS. 7a-7d.

Figure 7A:
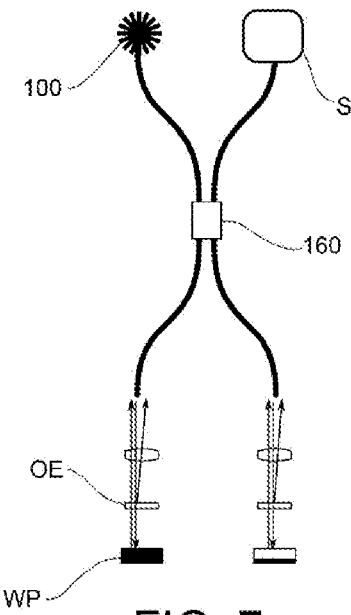
FIGS. 7a-7d are schematic representations of applications of the present invention.

FIG. 7a shows one application for measuring the separation distance between a laser beam processing tool and the surface of a piece being processed WP, performed simultaneously with the determination of the position of an optical element OE interposed along the direction of propagation of the laser beam.

In this application, in which the optical element OE interposed along the direction of propagation of the laser beam and the surface of the piece being processed WP constitute a plurality of elements at least partially reflective of an optical radiation in a system including at least one optical element of a processing or measuring assembly and an object external to this, being subjected to said processing or measuring, wherein the plurality of at least partially reflecting elements is arranged along a predetermined common measurement line, the method involves the phases of:

generating a measurement beam of low-coherence optical radiation, conducting the measurement beam along the measurement line toward a plurality of elements of the system, and conducting the measurement beam reflected or scattered by a back-reflecting surface of each element on which the measurement beam impinges with at least partial back reflection, toward the interferometric optical sensor means, in which the measurement beam travels on an optical measurement path from a respective source to the interferometric optical sensor means, including a first segment contained between the source and the back-reflecting surface of each element, and a second segment contained between the back-reflecting surface of each element and the interferometric sensor means, having a respective predetermined nominal geometric length when each element finds itself in a respective predetermined nominal position corresponding to a predetermined operating condition of the system, and comprising a first measurement beam resulting from the traveling of a first optical measurement path with reflection by a first element along the measurement line and a second multiplexed measurement beam resulting from the traveling of a second optical measurement path with reflection by a second element along the measurement line, having a greater geometrical length, different from the geometrical length of the first optical measurement path; and generating a respective reference beam of the low-coherence optical radiation, and conducting the reference beam toward the interferometric optical sensor means, in which the reference beam comprises a first reference beam resulting from the traveling of a first optical reference path of optical length equivalent to the optical length of the first optical measurement path in a nominal operating condition in which the position of the first element is the respective predetermined nominal position, and a second multiplexed reference beam resulting from the traveling of a second optical reference path having a geometrical length different from the geometrical length of the first optical reference path in an operating condition in which the position of the second element is the respective predetermined nominal position.

The first and the second measurement beam are superimposed respectively on the first and the second reference beam in at least one region of common incidence of the interferometric optical sensor means, along a predetermined axis of illumination.

Along the axis of illumination in the region of common incidence there is detected the position of a first interference fringe pattern between the first measurement beam and the first reference beam and of a second interference fringe pattern between the second measurement beam and the second reference beam having (i) a peak or maximum intensity of the envelope of the optical radiation different from the peak or maximum intensity of the envelope of the optical radiation of the first interference fringe pattern, or (ii) an intrinsic position of the envelope of intensity of the optical radiation different from the intrinsic position of the envelope of intensity of the optical radiation of the first interference fringe pattern, or (iii) a spatial frequency different from the spatial frequency of the first interference fringe pattern. Alternatively, in the region of common incidence there is detected the frequency of a first fringe pattern in the wavelength spectrum obtained by the interference between the first measurement beam and the first reference beam, or by wavelength dispersion of said beams, and that of a second interference fringe pattern between the second measurement beam and the second reference beam (i) having a frequency different from the frequency of the first interference fringe pattern, or (ii) determined by the superpositioning of the first second measurement and reference beams in a zone of said common region different from the zone of superpositioning of the first measurement and reference beams.

Finally, there is determined a difference in optical length between the first optical measurement path and the first optical reference path—indicative of a difference between (a) the current position of the first element and (b) the predetermined nominal position of the first element along the axis of the measurement beam—as a function of the position of the first interference fringe pattern along the axis of illumination of the region of incidence, or the frequency of the first interference fringe pattern in the frequency domain, respectively. Substantially at the same time there is also determined a difference in optical length between the second optical measurement path and the second optical reference path—indicative of a difference between (a) the current position of the second element and (b) the predetermined nominal position of the second element along the axis of the measurement beam—as a function of the position of the second interference fringe pattern along the axis of illumination of the region of incidence, or the frequency of the second interference fringe pattern in the frequency domain, respectively.

Figure 7B:
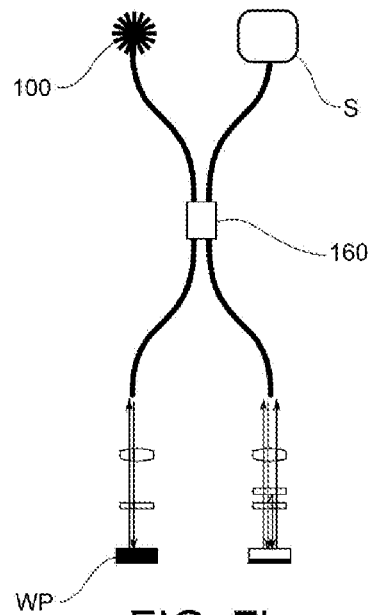

FIG. 7b shows one application for measuring the separation distance between a laser beam processing tool and the surface of a piece being processed WP, utilizing multiplexed reference beams corresponding to different intervals of operational separation distances, in order to measure such a distance on extensive or disjointed measurement intervals.

Figure 7C:
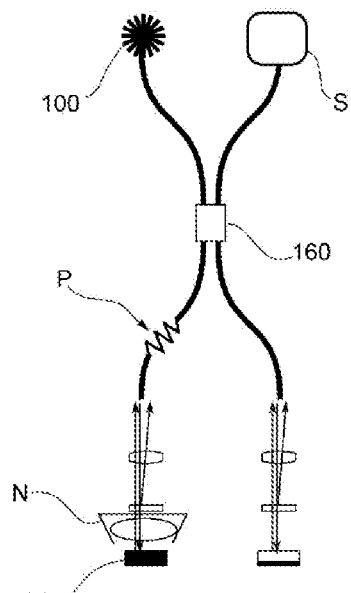

FIG. 7c shows one application for measuring the separation distance between a laser beam processing tool and the surface of a piece being processed WP, utilizing a calibration beam to provide a compensation of the distance measurement from perturbations thereof introduced by the effect of the pressure at the nozzle N, the temperature, or mechanical deformations to which the transmission means is exposed, acting on the path common to the calibration beam itself (as an example, a perturbation along the segment of the measurement path is denoted as P).

Figure 7D:
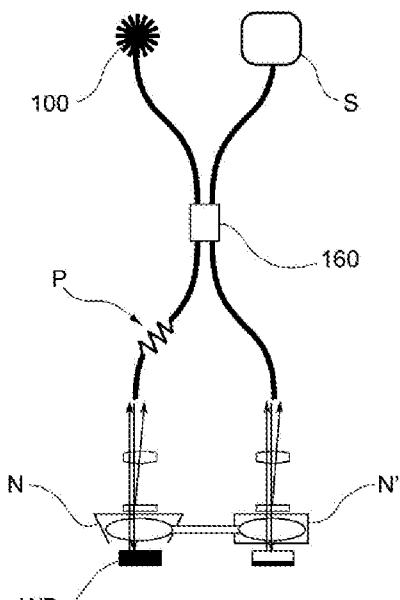

FIG. 7d shows one application for measuring the separation distance between a laser beam processing tool and the surface of a piece being processed WP in which a compensation is provided for the effect of the assist gas pressure at the nozzle N by means of an additional pressure chamber N' situated along the optical reference path (for example, being connected to the chamber of the nozzle so as to present the same pressure), at the same time as the compensation for perturbations along the optical measurement path (as an example, a perturbation along the segment of the measurement path is denoted as P), as in FIG. 7c.

The method may be implemented in real time during a processing process, for example, to describe the status of an optical element of the working head or to determine the separation distance of the working head from the current processing areas on the material, but also before or after the processing, for example, to describe a piece being processed or a processing which has been performed.

One specific application instance is described in the following.

In a machine for laser cutting, drilling, or welding of a material, or for the additive manufacturing of three-dimensional structures via laser, comprising a working head having a nozzle dispensing a flow of assist gas, for the determination of the separation distance between a working head of a machine for laser processing and the surface of a piece or material being processed, the measurement beam impinging on the sensor arrangement S comprises a main measurement beam resulting from the traveling of a main optical measurement path with reflection from the surface of the piece or material in the processing area, and transmission through each optical element interposed along the optical path of the processing laser beam, and at least one additional multiplexed measurement beam resulting from the traveling of an additional optical measurement path, with reflection from the surface of the piece or material being processed and having a geometrical length greater than the geometrical length of the main optical measurement path, for example because it includes at least one partial back reflection at the surface of an optical element interposed along the optical path of the processing laser beam.

In this embodiment, the method described in the invention is based on the detecting of the position of an additional interference fringe pattern in the region of common incidence C of the sensor arrangement S, determined by the interference between the additional measurement beam and the reference beam. In an interferometric technique with detection of the interference fringe pattern in the space domain, the additional interference fringe pattern presents for example (i) a peak or maximum intensity of the envelope of the optical radiation different from, for example less than, the peak or maximum intensity of the envelope of the optical radiation of the main interference fringe pattern between the main measurement beam and the reference beam, or (ii) an intrinsic position of the envelope of intensity of the optical radiation different from the intrinsic position of the envelope of intensity of the optical radiation of the main interference fringe pattern, in the case when it appears simultaneously with the main interference fringe pattern, or (iii) a spatial frequency different from the spatial frequency of the main interference fringe pattern in the case when the additional measurement beam impinges on the sensor arrangement at an angle different from the angle of incidence of the main measurement beam.

Figure 8A:
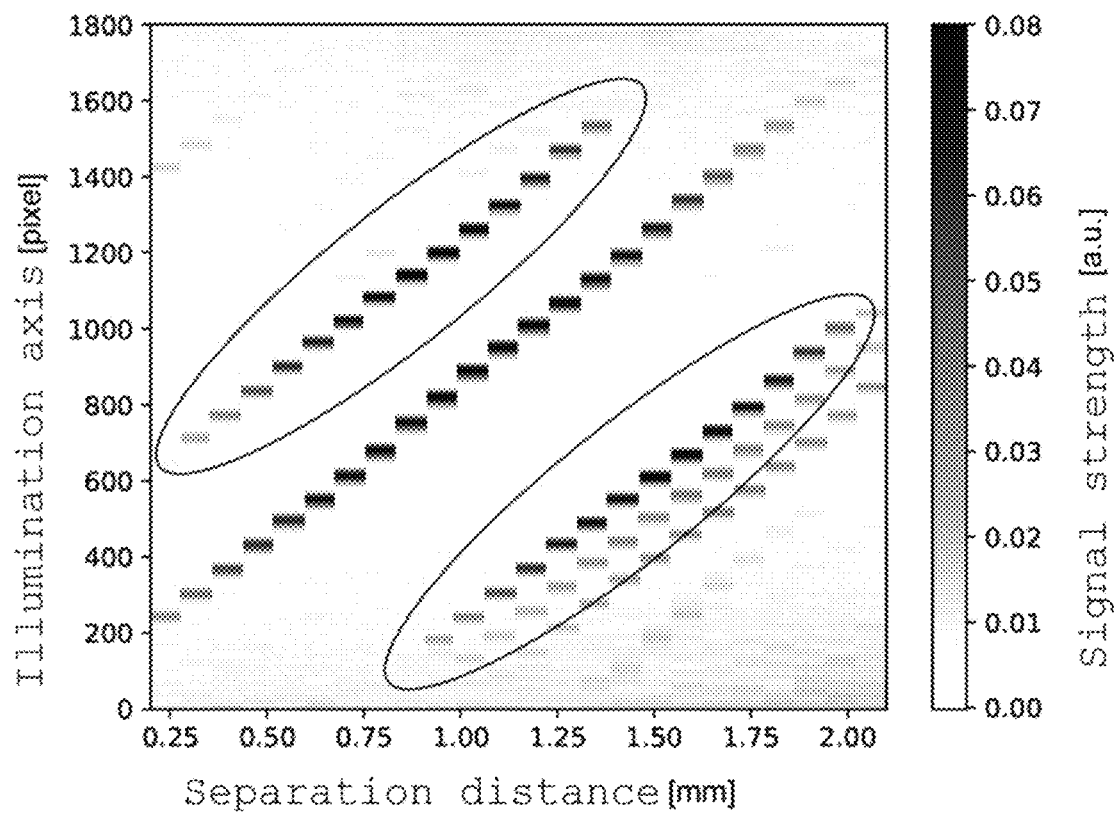
FIG. 8a is a diagram showing a main signal indicative of the localization of the interference fringe pattern along the illumination axis of the sensor device as a function of the separation distance between the working head and the material, and corresponding additional multiplexed signals indicative of the localization of respective additional interference fringe patterns along the illumination axis of the sensor device, resulting from the travel along an additional optical measurement or reference path having a geometrical length different from the geometrical length of the main optical measurement or reference path, which includes at least one partial back-reflection at the surface of an interposed optical element along the optical path of the working laser beam.

FIG. 8a is a diagram showing the signals put out by the photodetectors along the axis of illumination of the sensor arrangement S (vertical axis) indicative of the intensity of the envelope of the interference fringe pattern formed in the region of common incidence. Specifically, the figure shows the interferometric signals and therefore the spatial position of the interference fringe pattern along the axis of illumination (vertical axis) as a function of the separation distance between the working head and the facing material (horizontal axis). For example, such a diagram can be generated in a calibration phase by providing a fixed length of the optical reference path and continuously varying the mutual position between the working head and the surface of the material—that is, the separation distance of the working head from the surface of the material—along the z axis, and taking readings of the interferometric signal as a function of discrete predetermined values of the separation distance.

Figure 8B:
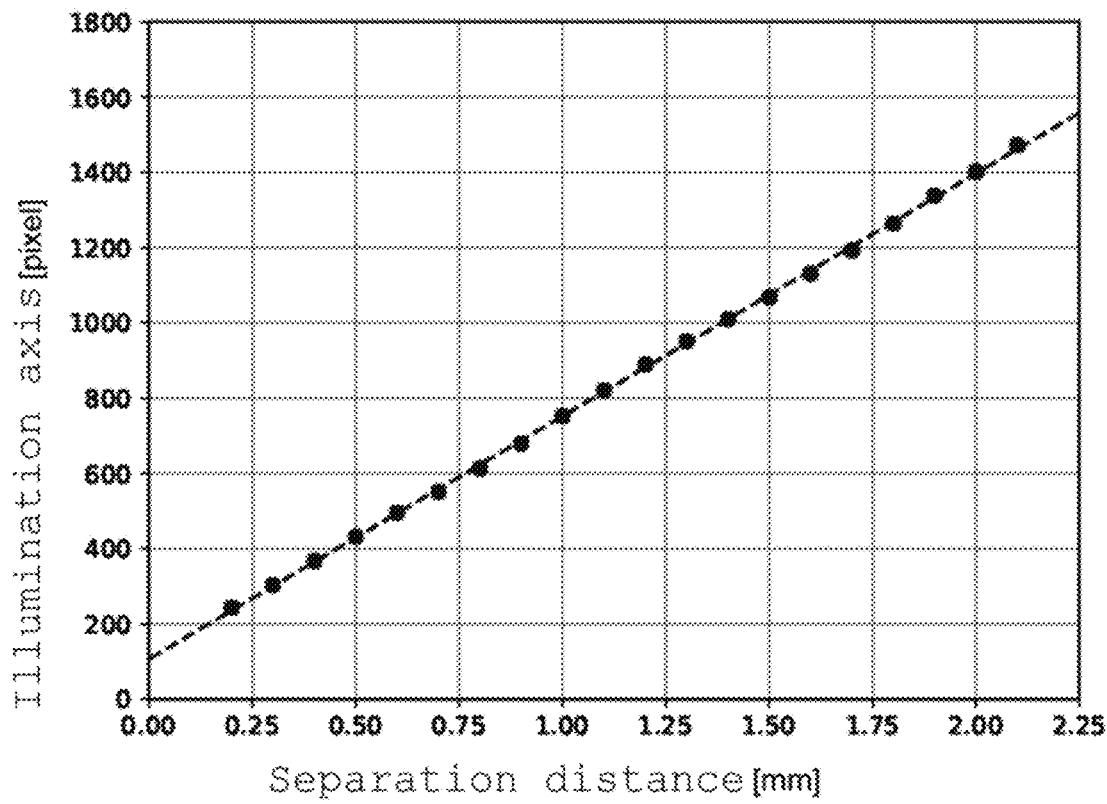
FIG. 8b is an exemplary calibration curve representing the signal peak indicative of a main interference fringe pattern as a function of the separation distance between the working head and the material.

One may note in the figure the acquisition of a strong interferometric signal in a condition of aliasing and the translation movement of the interference fringe pattern in an interval of around 2 mm (corresponding to around 1500 pixels) according to an approximately linear variation of the signal peak indicative of the interference fringe pattern, shown in FIG. 8b. The sensitivity can be defined as the separation distance corresponding to the dimension of a photodetector or a pixel of the region of incidence, in this case being 1.5 um/pixel. The translation movement of the envelope of the interference fringe pattern on the entire axis of illumination of the sensor arrangement allows a determination of a separation distance of the working head from the surface of the material of around 0.25 mm to around 2 mm.

The encircled areas show corresponding additional multiplexed signals indicative of the location of respective additional interference fringe patterns along the axis of illumination of the sensor arrangement, resulting from the traveling of a respective additional optical measurement path, having a geometrical length different from the geometrical length of the main optical measurement path, which includes at least one partial back reflection at the surface of an optical element interposed along the optical path of the processing laser beam.

In the case when several distinct operating intervals are not aligned or superimposed on the sensor arrangement, but instead are sufficiently separated to show alternately the respective interference fringes, the selection of the interference fringe pattern is automatic, by the effect of achieving a separation distance between the working head and material in which only one of either the main measurement beam or the additional measurement beam enters into interference with the reference beam, so as to produce an interference fringe pattern situated on the surface of the sensor arrangement S.

In the preceding condition, an optical length difference is thus determined between the additional optical measurement path and the optical reference path, which is indicative of a difference between (i) the current separation distance between the working head and the surface of the material in the processing area and (ii) the predetermined nominal separation distance, as a function of the position of the additional interference fringe pattern along the axis of illumination of the region of incidence.

As can be seen from FIG. 8a, a sensor arrangement S having an axis of illumination of lesser extension, such as half the extension used for the measurements in question, would still allow a detecting of the separation distance between the working head and the surface of the material in the same range of values of 0.25-2 mm, by relying on the reading of the signal indicative of the main interference fringe pattern in a first interval and the reading of the signal indicative of the additional interference fringe pattern in a second interval, thereby obtaining a significant increase in the measurement range based on illumination characteristics of the sensor arrangement.

Figure 8C:
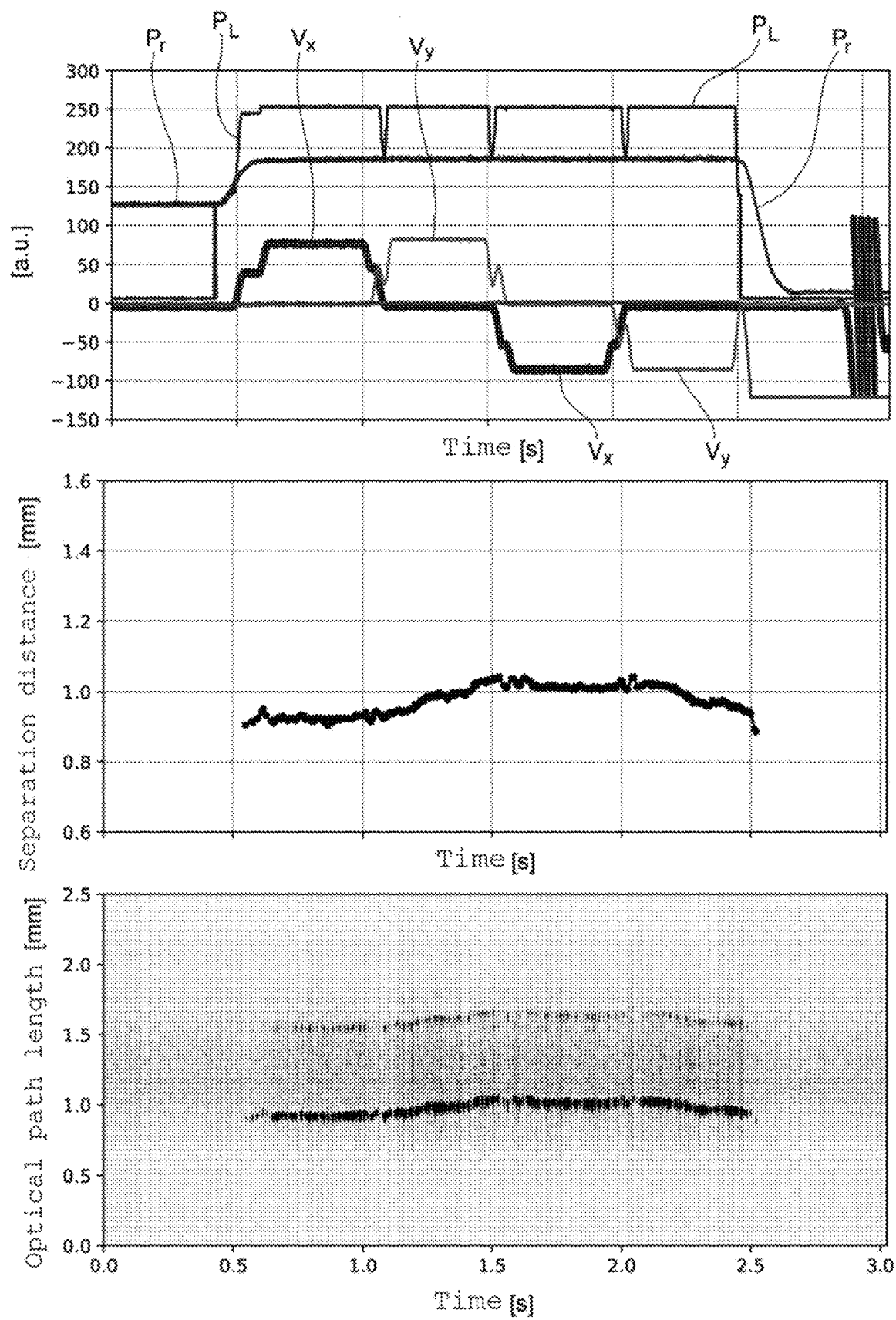
FIG. 8c shows a series of diagrams representative of a measurement performed during a cutting process.

FIG. 8c shows a series of diagrams representing a measurement performed during a laser cutting process, in this example a cutting process of a square notch of 40 mm on one side in a flat stainless steel sheet of thickness 3 mm, working with the working head at a nominal distance from the sheet varying between 0.9 and 1 mm in the course of the processing.

The upper diagram shows the time course of a series of process parameters. Specifically, the curves indicated by $V_x$ and $V_y$ represent the rate of translation movement of the cutting head along the orthogonal x and y directions in the cutting plane, the curve indicated by $P_L$ represents the optical intensity of the processing laser beam and the curve Pr represents the assist gas pressure. The middle diagram shows the course as measured by low-coherence optical interferometry of the real separation distance between the working head and the piece. The lower diagram shows the respective interference fringes obtained with a detection technique in the space domain, being visible in a main (lower) image of greater intensity and in an additional (upper) signal of lesser intensity, the course of which imitates the course of the main curve at a constant distance from it. The additional image is produced by internal or multiple back reflections induced by a surface of the optical chain interposed along the measurement path, determining an additional measurement beam multiplexed with the main beam.

In a different embodiment, the reference beam impinging on the sensor arrangement S comprises a main reference beam resulting from the traveling of a main optical reference path and at least one additional multiplexed reference beam resulting from the traveling of an additional optical reference path having a different geometrical length from the geometrical length of the main optical reference path.

In this embodiment, the method discussed in the invention is based on the detection of the position of an additional interference fringe pattern in the region of common incidence of the sensor arrangement S, determined by the interference between the measurement beam and the additional reference beam.

In this case as well, the additional interference fringe pattern presents for example (i) a peak or maximum intensity of the envelope of the optical radiation which is different from, for example less than, the peak or maximum intensity of the envelope of the optical radiation of the main interference fringe pattern between the measurement beam and the main reference beam, or (ii) an intrinsic position of the envelope of intensity of the optical radiation different from the intrinsic position of the envelope of intensity of the optical radiation of the main interference fringe pattern, in the case when appearing at the same time as the main interference fringe pattern, or (iii) a spatial frequency different from the spatial frequency of the main interference fringe pattern in the case when the additional reference beam impinges on the sensor arrangement at an angle different from the angle of incidence of the main reference beam.

In the case when several distinct operating intervals are not aligned or superimposed on the sensor arrangement, but instead are sufficiently separated to show alternately the respective interference fringes, the selection of the interference fringe pattern occurs by selecting the additional reference path.

In the preceding condition, an optical length difference is thus determined between the optical measurement path and the additional optical reference path, which is indicative of a difference between (i) the current separation distance between the working head and the surface of the material in the processing area and (ii) the predetermined nominal separation distance, as a function of the position of the additional interference fringe pattern along the axis of illumination of the region of incidence.

Advantageously, the technique discussed in the invention makes it possible to also determine a perturbation of the current optical length of at least one portion of the optical measurement path with respect to the current optical length of a corresponding portion of the optical reference path, and to correct the value determined for the separation distance between the working head and the surface of the material due to this perturbation. The perturbation occurs, for example, as a result of the variation in at least one physical parameter of the transmission means within which the optical measurement path extends.

For these purposes, the measurement beam impinging on the sensor arrangement S comprises at least one additional calibration measurement beam resulting from the traveling of an additional calibration optical measurement path, in which the measurement beam is reflected or scattered by at least one back-reflecting surface of a static optical element interposed along the optical measurement path, and in which the reference beam impinging on the sensor arrangement S comprises a respective additional calibration reference beam resulting from the traveling of an additional calibration optical reference path having an optical length equivalent to the optical length of the calibration optical measurement path in a nominal calibration operating condition in which the geometrical length and the index of refraction of the transmission means of the calibration optical measurement path are equal to the geometrical length and index of refraction of the transmission means of the calibration optical reference path within a given tolerance range. The static optical element can be, for example, an element of the optical focusing system of the laser beam.

The determination of the perturbation of the current optical length of at least one portion of the optical measurement path includes the following operations:

superpositioning of the calibration measurement beam and the calibration reference beam in a region of common incidence of the sensor arrangement S, along the axis of illumination;

detecting of the position of an interference fringe pattern between the calibration measurement beam and the calibration reference beam along the axis of illumination in the region of common incidence, or the frequency of an interference fringe pattern between the calibration measurement beam and the calibration reference beam using an interferometry technique with detection in the frequency domain; and determination of a difference in optical length between the calibration optical measurement path and the calibration optical reference path—indicative of a difference between (a) the geometrical length of the calibration optical measurement path and the geometrical length of the calibration optical reference path, and/or (b) the index of refraction of the calibration optical measurement path and the index of refraction of the calibration optical reference path—as a function of the position of the interference fringe pattern along the axis of illumination of the region of incidence, or the frequency of the interference fringe pattern in the frequency domain, respectively. The difference in optical length between the calibration optical measurement path and the calibration optical reference path is indicative of said perturbation of the current optical length of at least one portion of the optical measurement path.

In the case when the position of the interference fringe pattern is detected, a predetermined reference position of the interference fringe pattern—corresponding to the condition of equality of optical length of the calibration optical measurement and reference paths—may be, solely as an indicative and not a limiting example, a median position or an extreme position along the axis of illumination of the photodetectors.

In the case when the frequency of the interference fringe pattern is detected, according to the known art for detection in the spectral domain or the Fourier domain, a predetermined reference position of the interference fringe pattern—corresponding to the condition of equality of optical length of the calibration optical measurement and reference paths—may be, solely as an indicative and not a limiting example, the median frequency in the space of the Fourier transform.

Advisedly, the accurate determination of the separation distance between the working head and the surface of the material in a processing area, whether this be a current processing area or a calibration processing area, allows a control unit of the machine for laser processing to respond to the correction or the control of the processing distance, or other processing parameters, for example by acting on the movement actuator means for control of the movement of the working head along the Z axis, coming closer to or moving away from the material, as a function of the outcome of the interferometry measurement. This is particularly useful in improving the efficiency of a cutting process, for example.

It will be noted that the realization proposed by the present invention in the preceding discussion is of a purely exemplary and not limiting nature of the present invention. A person skilled in the art may easily implement the present invention in different embodiments, yet not removed from the principles explained here, and therefore falling within the present patent.

This holds in particular for the possibility of using wavelengths of the low-coherence optical radiation different from the ones mentioned, or optical measurement and reference paths with different interposed optical elements from those illustrated in FIG. 5, merely as a nonlimiting example.

Of course, while keeping to the principle of the invention, the forms of implementation and in particular realization may be broadly varied with respect to what has been described and illustrated, merely as a nonlimiting example, without thereby leaving the scope of protection of the invention as defined by the appended claims.

The invention claimed is:

1. A method for determining a relative position of an element of an optical system of an assembly for processing or measuring an object along a predetermined measurement line associated with the optical system, the method comprising:

generating a measurement beam of low coherence optical radiation, leading said measurement beam along said predetermined measurement line towards said element, and leading the measurement beam reflected or diffused by a back-reflective surface of said element on which said measurement beam impinges with an at least partial back-reflection, towards an optical interferometric sensor arrangement, wherein the measurement beam travels a measurement optical path from a respective source to said optical interferometric sensor arrangement including a first section between said source and said back-reflective surface of said element and a second section between said back-reflective surface of said element and the interferometric sensor arrangement, having a respective predetermined nominal geometric length when said element is in a predetermined nominal position corresponding to a predetermined operating condition of said optical system, generating a reference beam of said low coherence optical radiation, and leading said reference beam towards said optical interferometric sensor arrangement, wherein the reference beam comprises a main reference beam which results from travel of a main reference optical path having an optical length equivalent to the optical length of the measurement optical path in a nominal operating condition in which a position of said element is the predetermined nominal position, and at least one additional multiplexed reference beam which results from travel of an additional reference optical path having a geometric length different from the geometric length of said main reference optical path in an operating condition in which the position of said element is a predetermined modified position;

superimposing the measuring beam and the reference beam on a common region of incidence of said optical interferometric sensor arrangement, along a predetermined illumination axis;

detecting along said predetermined illumination axis on said common region of incidence a position of a main pattern of interference fringes between the measurement beam and the main reference beam, wherein an extension of said main pattern of interference fringes along the predetermined illumination axis corresponds to a coherence length of said low coherence optical radiation, and of an additional pattern of interference fringes between the measurement beam and the additional multiplexed reference beam having (i) a peak or maximum of an intensity envelope of optical radiation different from the peak or maximum of an intensity envelope of optical radiation of the main pattern of interference fringes, or (ii) an intrinsic position of the intensity envelope of optical radiation offset from the intrinsic position of the intensity envelope of optical radiation of the main pattern of interference fringes, or (iii) a spatial frequency different from the spatial frequency of the main pattern of interference fringes, or detecting on said common region of incidence a frequency of a pattern of fringes in a wavelength spectrum, obtained from a main interference between the measurement beam and the main reference beam by wavelength dispersion of said measurement and main reference beams, the extension of which in a frequency domain is determined by the coherence length of said low coherence optical radiation, and by an additional pattern of interference fringes between the measurement beam and the additional multiplexed reference beam (i) having a frequency different from the frequency of the main pattern of interference fringes, or (ii) determined by superposition of the measurement and additional multiplexed reference beams on an area of said common region of incidence different from an overlapping area of the measurement and main reference beams; and determining a difference in optical length between the measurement optical path and the reference optical path or the additional reference optical path, indicative of a difference between (a) a current position of said element and (b) the predetermined nominal position or the predetermined modified position, respectively, of said element along an axis of the measurement beam, as a function respectively of the position of said main pattern of interference fringes or of said additional pattern of interference fringes along said predetermined illumination axis of said common region of incidence, or of the frequency of said main pattern of interference fringes or of said additional pattern of interference fringes in the frequency domain.

2. The method of claim 1, wherein said main reference optical path and said additional reference optical path are superimposed at least for a portion and impinge co-linearly on the common region of incidence of said optical interferometric sensor arrangement.

3. The method of claim 2, wherein said additional reference optical path includes at least a partial back-reflection at a surface of an optical element interposed along the main reference optical path.

4. The method of claim 2, wherein said additional reference optical path includes at least a back-reflection internal to an optical element interposed along the main reference optical path.

5. The method of claim 2, wherein said additional reference optical path includes a path section deflected with respect to the main reference optical path.

6. The method of claim 5, wherein said deflected path section is obtained by interposing an optical element for partial extraction of the reference beam from the main reference optical path and an optical element for reintroduction of the extracted reference beam into the beam in the main reference optical path.

7. The method of claim 6, wherein said optical element for partial extraction of the reference beam is a beam splitting optical device.

8. The method of claim 6, wherein said optical element for partial extraction of the reference beam is a prism configured to control optical length of deflected path section with continuity.

9. The method of claim 1, wherein said main reference optical path and said additional reference optical path impinge on respective different areas of said common region of incidence of the optical interferometric sensor arrangement.

10. The method of claim 1, wherein said optical interferometric sensor arrangement comprises a linear arrangement of photodetectors along said predetermined illumination axis.

11. The method of claim 1, wherein said optical interferometric sensor arrangement comprises a two-dimensional arrangement of photodetectors along said predetermined illumination axis.

12. A machine for laser processing of a material, operating by a processing laser beam conducted along an optical path for transporting the laser beam comprising an optical system, wherein the machine comprises a system for determining a relative position of an element of said optical system, configured to carry out the method of claim 1.

13. A method for determining a relative position of an element of an optical system of an assembly for processing or measuring an object along a predetermined measurement line associated with the optical system, the method comprising:

generating a measurement beam of low coherence optical radiation, leading said measurement beam along said predetermined measurement line towards said element, and leading the measurement beam reflected or diffused by a back-reflective surface of said element on which said measurement beam impinges with at least a partial back-reflection, towards an optical interferometric sensor arrangement, wherein the measurement beam travels a measurement optical path from a respective source to said optical interferometric sensor arrangement including a first section between said source and said back-reflective surface of said element, and a second section between said back-reflective surface of said element and the interferometric sensor arrangement, having a respective predetermined nominal geometric length when said element is in a predetermined nominal position corresponding to a predetermined operating condition of said optical system, and comprises a main measurement beam which results from travel of a main measurement optical path with transmission through at least one optical element interposed upstream of said element along the predetermined measurement line and an additional multiplexed measurement beam resulting from travel of an additional measurement optical path having a geometric length different from the geometric length of said main measurement optical path;

generating a reference beam of said low coherence optical radiation, and leading said reference beam towards said optical interferometric sensor arrangement, wherein the reference beam travels a reference optical path having an optical length equivalent to the optical length of the main measurement optical path in a nominal operating condition in which a position of said element is the predetermined nominal position;

superimposing the measurement beam and the reference beam on a common region of incidence of said optical interferometric sensor arrangement, along a predetermined illumination axis;

detecting along said predetermined illumination axis on said common region of incidence a position of a main pattern of interference fringes between the main measurement beam and the reference beam, wherein an extension of said main pattern of interference fringes along the predetermined illumination axis corresponds to a coherence length of said low coherence optical radiation, and of an additional pattern of interference fringes between the additional multiplexed measurement beam and the reference beam having (i) a peak or maximum of an intensity envelope of optical radiation different from the peak or maximum of an intensity envelope of optical radiation of the main pattern of interference fringes, or (ii) an intrinsic position of the intensity envelope of optical radiation offset from the intrinsic position of the intensity envelope of optical radiation of the main pattern of interference fringes, or (iii) a spatial frequency different from the spatial frequency of the main pattern of interference fringes, or detecting on said common region of incidence a frequency of a pattern of fringes in a wavelength spectrum, obtained from a main interference between the main measurement beam and the reference beam by wavelength dispersion of said main measurement and reference beams, an extension of which in a frequency domain is determined by the coherence length of said low coherence optical radiation, and of an additional pattern of interference fringes between the additional multiplexed measurement beam and the reference beam (i) having a frequency different from the frequency of the main pattern of interference fringes, or (ii) determined by superposition of the additional measurement and reference beams on an area of said common region of incidence different from an overlapping area of the main measurement and reference beams; and determining a difference in optical length between the measurement optical path or the additional measurement optical path and the reference optical path, indicative of a difference between (a) a current position of said element and (b) the predetermined nominal position of said element along an axis of the measurement beam, as a function respectively of the position of said pattern of interference fringes or of said additional pattern of interference fringes along said predetermined illumination axis of said common region of incidence, or of the frequency of said pattern of interference fringes or said additional pattern of interference fringes in the frequency domain.

14. The method of claim 13, wherein said main measurement optical path and said additional measurement optical path are superimposed at least for a portion and impinge co-linearly on the common region of incidence of said optical sensor interferometric arrangement.

15. The method of claim 14, wherein said additional measurement optical path includes at least a partial back-reflection at the surface of an optical element interposed along the main measurement optical path.

16. The method of claim 14, wherein said additional measurement optical path includes at least a back-reflection within an optical element interposed along the optical path of the main measurement beam.

17. The method of claim 14, wherein said additional measurement optical path includes a path section deflected from the main measurement optical path.

18. The method of claim 17, wherein said deflected path section is obtained by interposing an optical element for partial extraction of the measurement beam from the main measurement optical path and an optical element for reintroduction of the extracted measurement beam in the beam in the main measurement optical path.

19. The method of claim 18, wherein said optical element for partial extraction of the measurement beam is a beam splitting optical device.

20. The method according to claim 18, wherein said optical element for partial extraction of the measurement beam is a prism configured to control optical length of the deflected path section with continuity.

21. The method of claim 13, wherein said main measurement optical path and said additional measurement optical path impinge on respective different areas of said common region of incidence of the optical interferometric sensor arrangement.

22. A machine for laser processing of a material, operating by a processing laser beam conducted along an optical path for transporting the laser beam comprising an optical system, wherein the machine comprises a system for determining a relative position of an element of said optical system, configured to carry out the method of claim 13.

23. A method for determining a position of a plurality of elements at least partially reflecting an optical radiation in a system including a plurality of optical components of a processing or measurement assembly, or including at least one optical element of a processing or measurement assembly and an object external thereto and subject to said processing or measurement, wherein said plurality of at least partially reflective elements is arranged along a predetermined common measurement line, the method comprising:

generating a measurement beam of low-coherence optical radiation, leading said measurement beam along said predetermined common measurement line towards the plurality of at least partially reflective elements of the system, and leading the measurement beam reflected or diffused from a back-reflective surface of each element of the plurality of at least partially reflective elements on which said measurement beam impinges with at least a partial back-reflection, towards an optical interferometric sensor arrangement, wherein the measurement beam travels a measurement optical path from a respective source to said optical interferometric sensor arrangement including a first section between said source and said back-reflective surface of each element of the plurality of at least partially reflective elements, and a second section between said back-reflective surface of each element of the plurality of at least partially reflective elements and the interferometric sensor arrangement, having a respective predetermined nominal geometric length when each element of the plurality of at least partially reflective elements is in a respective predetermined nominal position corresponding to a predetermined operating condition of said system, and comprises a first measurement beam which results from travel of a first measurement optical path with reflection from a first element along the predetermined common measurement line and a second multiplexed measurement beam which results from travel of a second measurement optical path with reflection from a second element along the predetermined common measurement line, having a geometric length different from the geometric length of said first measurement optical path;

generating a reference beam of said low coherence optical radiation, and leading said reference beam towards said optical interferometric sensor arrangement, wherein the reference beam comprises a first reference beam which results from travel of a first reference optical path having an optical length equivalent to the optical length of the first measurement optical path in a nominal operating condition in which a position of said first element is the respective predetermined nominal position, and a second multiplexed reference beam which results from travel of a second reference optical path having a geometric length different from the geometric length of said first reference optical path in an operating condition in which the position of said second element is the respective predetermined nominal position;

superimposing the first and second multiplexed measurement beams respectively on the first and second multiplexed reference beams on a common region of incidence of said optical interferometric sensor arrangement, along a predetermined illumination axis;

detecting along said predetermined illumination axis on said common region of incidence a position of a first pattern of interference fringes between the first measurement beam and the first reference beam, wherein an extension of said pattern of interference fringes along the predetermined illumination axis corresponds to a coherence length of said low coherence optical radiation, and of a second pattern of interference fringes between the second multiplexed measurement beam and the second multiplexed reference beam having (i) a peak or maximum of an intensity envelope of optical radiation different from the peak or maximum of an intensity envelope of optical radiation of the first pattern of interference fringes, or (ii) an intrinsic position of the intensity envelope of optical radiation offset from the intrinsic position of the intensity envelope of optical radiation of the first pattern of interference fringes, or (iii) a spatial frequency different from the spatial frequency of the first pattern of interference fringes, or detecting on said common region of incidence a frequency of a first pattern of fringes in a wavelength spectrum, obtained by interference between the first measurement beam and the first reference beam by wavelength dispersion of said first measurement and first reference beams, whose extension in a frequency domain is determined by the coherence length of said low coherence optical radiation, and of a second pattern of interference fringes between the second multiplexed measurement beam and the second multiplexed reference beam (i) having a frequency different from the frequency of the first pattern of interference fringes, or (ii) determined by superposition of the first measurement and first reference beams on an area of said common region of incidence different from an overlapping area of the first measurement and first reference beams; and determining:
(i) a difference in optical length between the first measurement optical path and the first reference optical path, indicative of a difference between (a) a current position of said first element and (b) the predetermined nominal position of said first element along an axis of the measurement beam, as a function respectively of the position of said first pattern of interference fringes along said predetermined illumination axis of said common region of incidence, or of the frequency of said first pattern of interference fringes in the frequency domain; and
(ii) a difference in optical length between the second measurement optical path and the second reference optical path, indicative of a difference between (a) the current position of said second element and (b) the predetermined nominal position of said second element along the axis of the measurement beam, as a function respectively of the position of said second pattern of interference fringes along said predetermined illumination axis of said common region of incidence, or of the frequency of said second pattern of interference fringes in the frequency domain.

* * * * *